US011756507B2

(12) United States Patent
Lee et al.

(10) Patent No.: US 11,756,507 B2
(45) Date of Patent: Sep. 12, 2023

(54) MOBILE TERMINAL FOR DISPLAYING CONTENT AND CONTROL METHOD THEREOF

(71) Applicant: LG ELECTRONICS INC., Seoul (KR)

(72) Inventors: Juhye Lee, Seoul (KR); Shinhui Ahn, Seoul (KR); Euitaek Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 200 days.

(21) Appl. No.: 17/019,114

(22) Filed: Sep. 11, 2020

(65) Prior Publication Data

US 2021/0350767 A1 Nov. 11, 2021

(30) Foreign Application Priority Data

May 7, 2020 (WO) ................ PCT/KR2020/006043

(51) Int. Cl.
| | | |
|---|---|---|
| *G09G 5/14* | (2006.01) | |
| *G06F 3/14* | (2006.01) | |
| *G09G 5/38* | (2006.01) | |
| *G06Q 30/02* | (2012.01) | |
| *G06F 3/041* | (2006.01) | |
| *G06Q 30/0241* | (2023.01) | |
| *G06Q 30/0251* | (2023.01) | |

(52) U.S. Cl.
CPC ............. *G09G 5/14* (2013.01); *G06F 3/14* (2013.01); *G06Q 30/0267* (2013.01); *G06Q 30/0277* (2013.01); *G09G 5/38* (2013.01); *G06F 3/0416* (2013.01); *G06F 2203/04102* (2013.01); *G09G 2354/00* (2013.01); *G09G 2380/02* (2013.01)

(58) Field of Classification Search
CPC ....................................................... G09G 5/14
See application file for complete search history.

(56) References Cited

U.S. PATENT DOCUMENTS

| 10,444,886 B2 | 10/2019 | Namgoong et al. |
| 2010/0048252 A1 | 2/2010 | Kang et al. |
| (Continued) | | |

FOREIGN PATENT DOCUMENTS

| KR | 10-1533099 | 3/2010 |
| KR | 10-2017-0046410 | 5/2017 |
| (Continued) | | |

OTHER PUBLICATIONS

PCT International Application No. PCT/KR2020/006043, International Search Report dated Jan. 26, 2021, 4 pages.

*Primary Examiner* — Gustavo Polo
(74) *Attorney, Agent, or Firm* — LEE, HONG, DEGERMAN, KANG & WAIMEY PC

(57) ABSTRACT

Provided is a mobile terminal including a display located at a first side of the mobile terminal and a second side of the mobile terminal facing the first side, and a controller configured to display content related to a first application in a first area of the display located at the first side, the content including at least one sub-content, identify one or more sub-contents of the at least one sub-content in response to a first input related to the one or more sub-contents being received, and display at least a portion of the identified one or more sub-contents in a second area of the display located at the second side.

19 Claims, 23 Drawing Sheets

(56) References Cited

U.S. PATENT DOCUMENTS

| | | | | |
|---|---|---|---|---|
| 2014/0189515 A1* | 7/2014 | Waldman | ................ | G09G 5/00 |
| | | | | 715/719 |
| 2018/0181999 A1 | 6/2018 | Kim et al. | | |
| 2020/0242303 A1 | 7/2020 | Hwang et al. | | |
| 2020/0341578 A1 | 10/2020 | Shim et al. | | |

FOREIGN PATENT DOCUMENTS

| KR | 10-2017-0085344 | 7/2017 |
|---|---|---|
| KR | 10-1782088 | 9/2017 |
| KR | 10-1852905 | 4/2018 |
| KR | 10-2018-0073188 | 7/2018 |

\* cited by examiner

FIG. 2
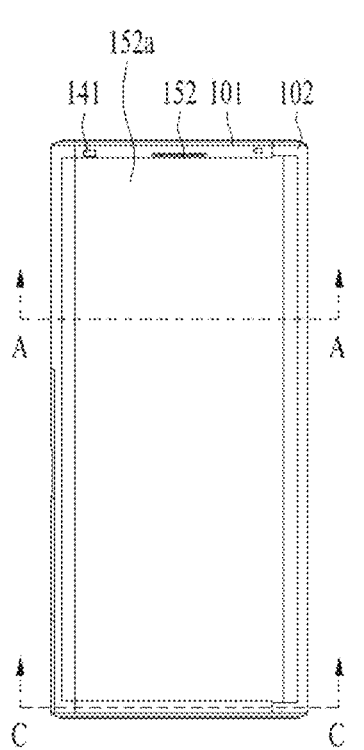
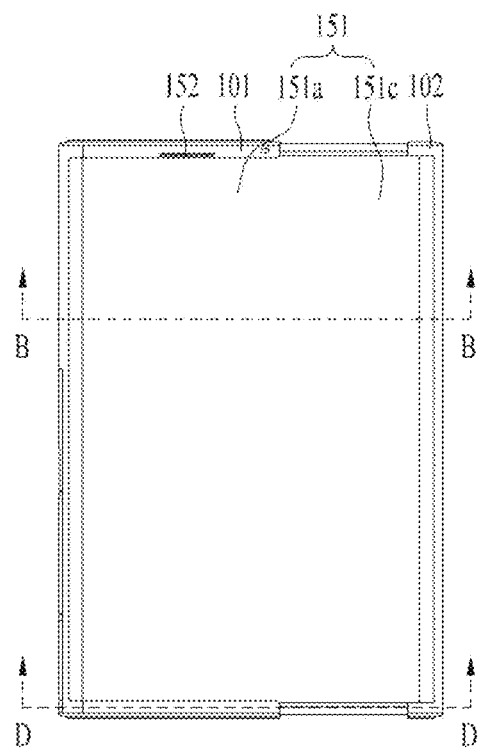

FIG. 6
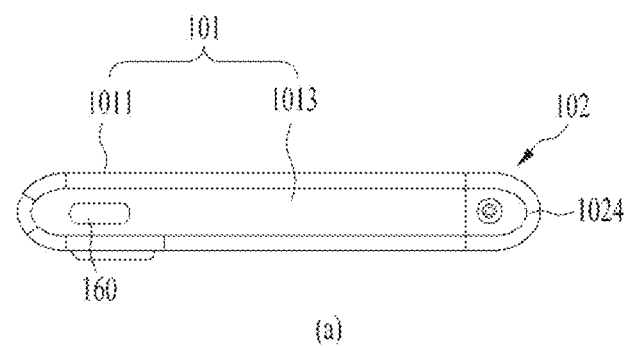
(a)
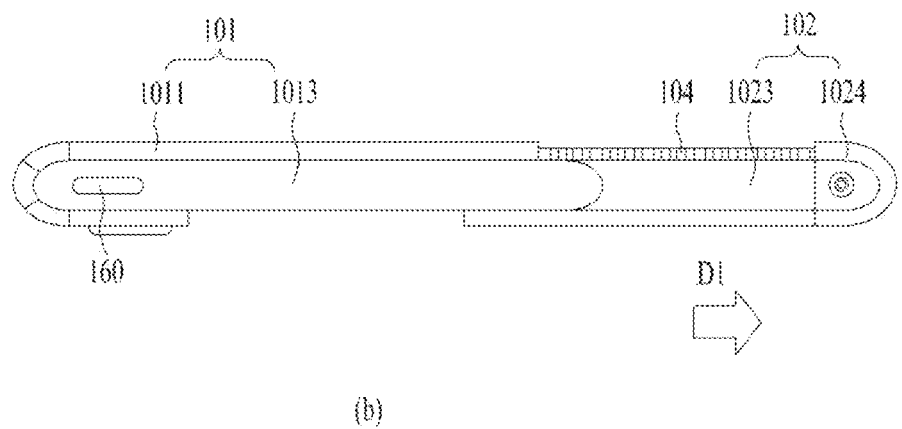
(b)

FIG. 7
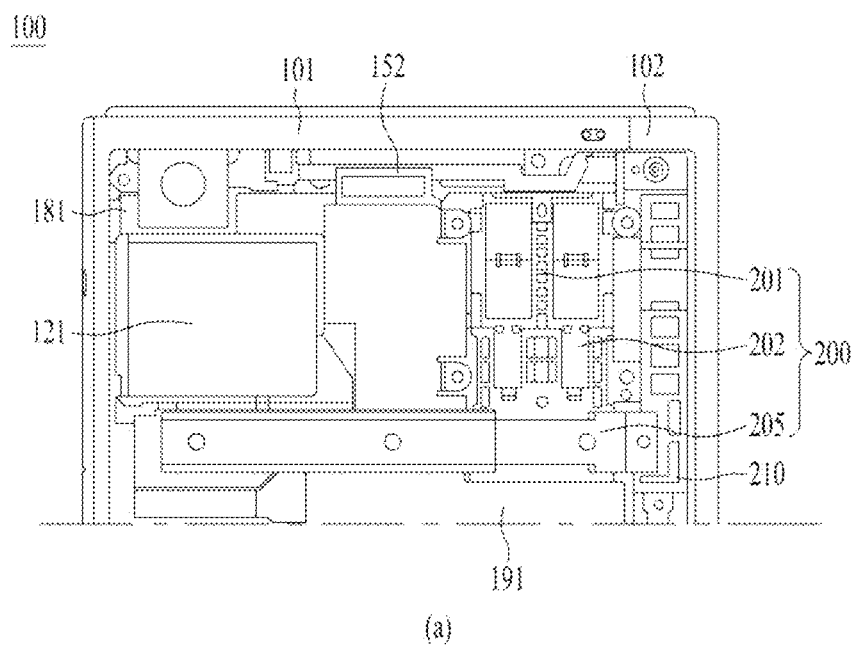
(a)
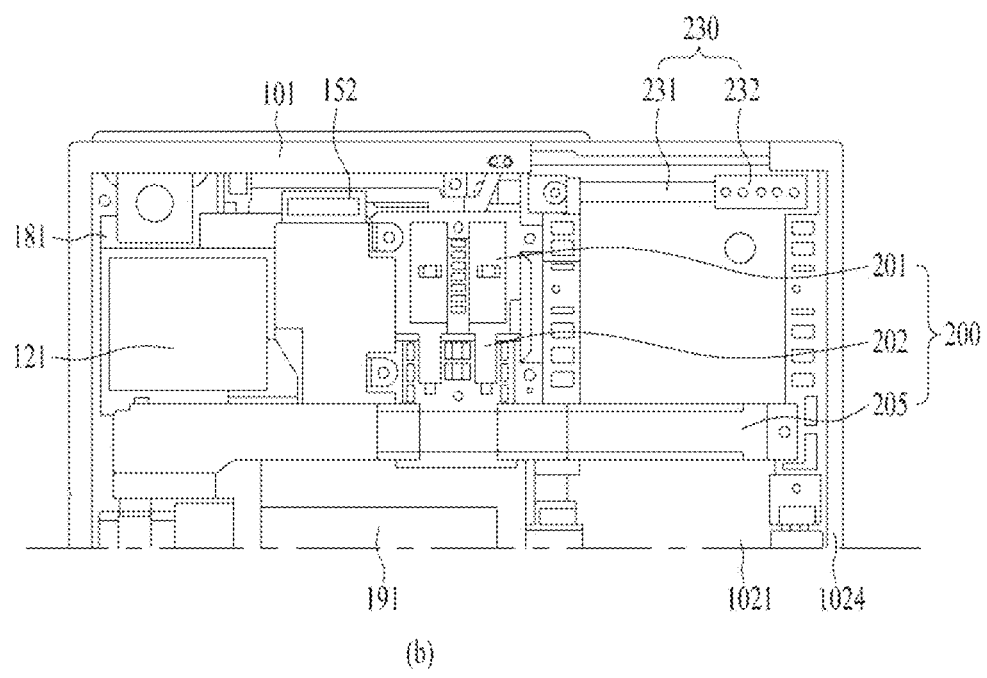
(b)

FIG. 8
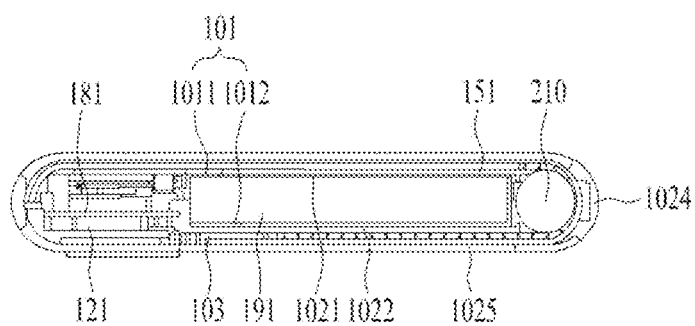
(a)
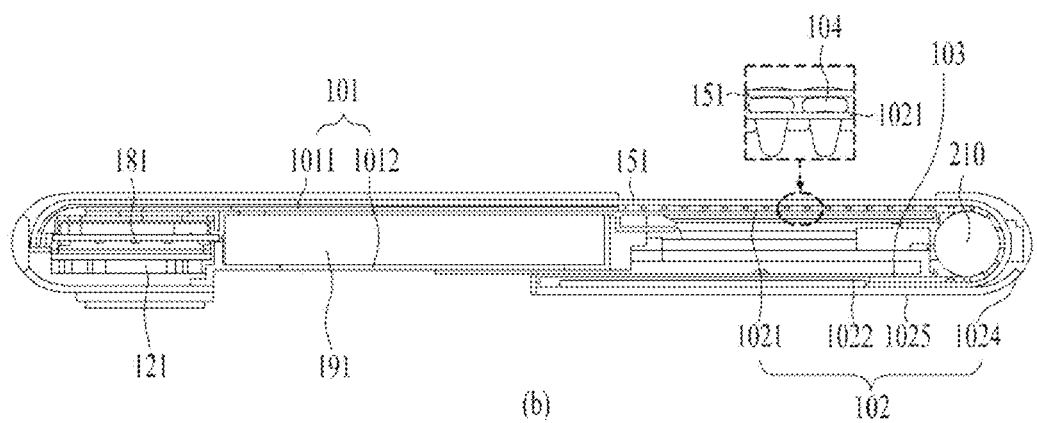
(b)

FIG. 12
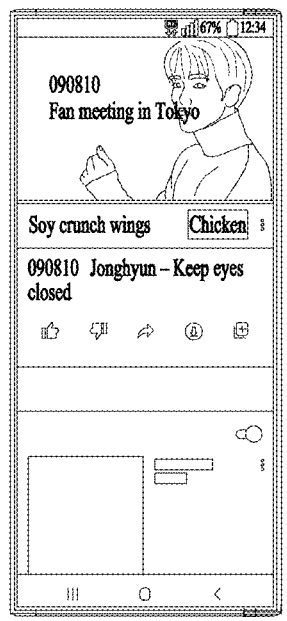
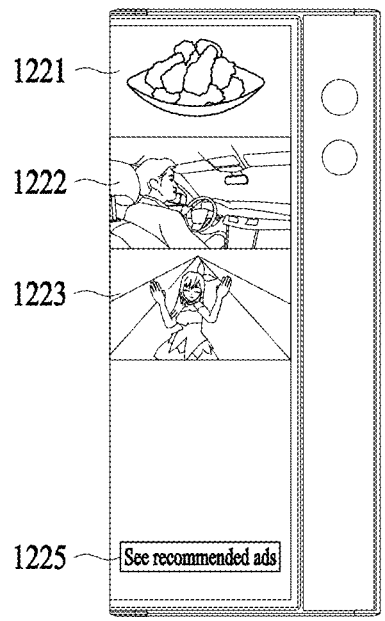
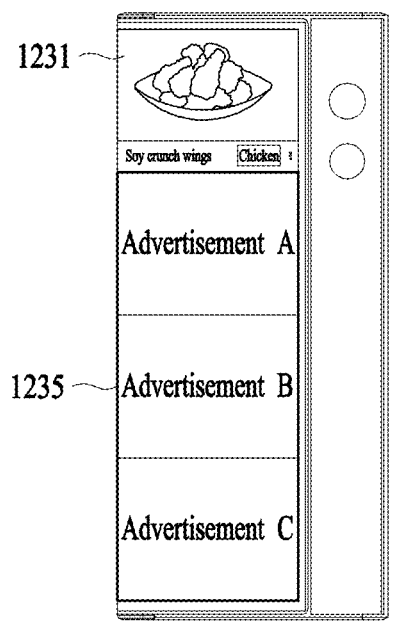
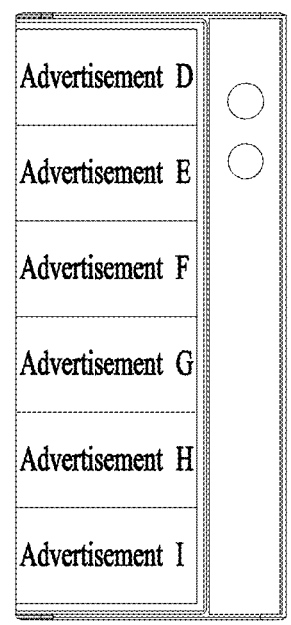

FIG. 23
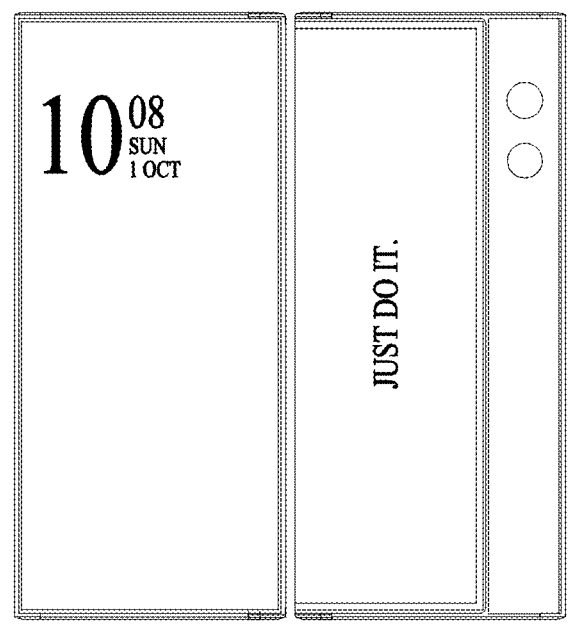
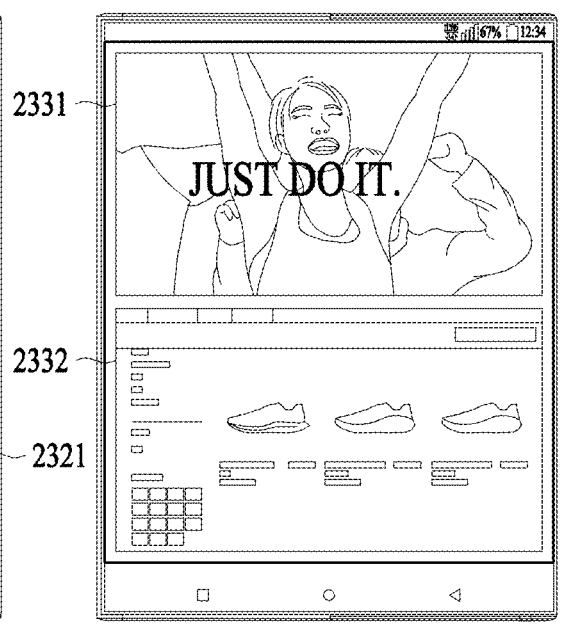

MOBILE TERMINAL FOR DISPLAYING CONTENT AND CONTROL METHOD THEREOF

CROSS-REFERENCE TO RELATED APPLICATION

Pursuant to 35 U.S.C. § 119 (a), this application claims the benefit of an earlier filing date and right of priority to International Application No. PCT/KR2020/006043 filed on May 7, 2020, the contents of which are hereby incorporated by reference herein in its entirety.

BACKGROUND

1. Field

This disclosure relates to a mobile terminal for displaying content of an application and a control method thereof. One particular implementation relates to a mobile terminal that displays sub-content included in content related to an application in a predetermined area and a control method thereof.

2. Description of the Related Art

Advances of network technologies and expansions of infrastructures have enabled an electronic device to perform various and professional tasks. In this regard, there has been an increasing desire for an electronic device with a display that displays content on a large screen.

However, a display providing a large screen may increase in size in proportion to a screen size. Thus, it is necessary to consider a portability along with a size of the display in terms of an electronic device of which the portability is emphasized, such as a mobile terminal.

For this, there can be considered a method to change a size of a display as necessary by applying a foldable or rollable display having a sufficient elasticity to the electronic device. Also, a method to arrange a display at different sides and change a size of the display as necessary may be considered. For example, a portion of a display may be rolled up to a rear side of a mobile terminal, and rolled out or moved as necessary such that an exposed area of the display increases.

When the display is divided into areas due to such arrangement, the electronic device may provide a variety of information to a user based on one area among the areas. For example, the electronic device may display content in an area of the display located at one side, so that the user uses the electronic device based on the area in which the content is displayed.

However, in this case, a usability of another side of the electronic device may be relatively low. Accordingly, a utilization method is required to improve a usability of the electronic device.

SUMMARY

An aspect provides a mobile terminal and a control method thereof. The mobile terminal may provide sub-content of contents provided through a first area of the display, through a second area of a display. Through this, the mobile terminal may easily identify the sub-content and efficiently use the first area and the second area of the display, which may improve usability of the mobile terminal.

Technical goals of the present disclosure are not limited as mentioned above and, although not mentioned, may include goals that can be clearly understood by those skilled in the art to which the present disclosure pertains, from the following description.

According to an aspect, there is provided a mobile terminal including a display located at a first side of the mobile terminal and a second side of the mobile terminal facing the first side, and a controller configured to display content related to a first application in a first area of the display located at the first side, the content including at least one sub-content, identify one or more sub-contents of the at least one sub-content in response to a first input related to the one or more sub-contents being received, and display at least a portion of the identified one or more sub-contents in a second area of the display located at the second side.

According to another aspect, there is also provided a method of controlling a mobile terminal, which includes a display located at a first side of the mobile terminal and a second side of the mobile terminal facing the first side, the method including displaying content related to a first application in a first area of the display located at the first side, the content including at least one sub-content, identifying one or more sub-contents of the at least one sub-content in response to a first input related to the one or more sub-contents being received, and displaying at least a portion of the identified one or more sub-contents in a second area of the display located at the second side.

BRIEF DESCRIPTION OF THE DRAWINGS

The above and other aspects, features, and advantages of certain embodiments will be more apparent from the following detailed description taken in conjunction with the accompanying drawings, in which:

FIG. 2 illustrates front views of a mobile terminal in a first state and a second state according to an example embodiment;

FIG. 6 illustrates side views of a mobile terminal from a third direction according to an example embodiment;

FIG. 7 illustrates a driving part of a mobile terminal according to an example embodiment;

FIG. 8 illustrates cross-sectional views taken along lines A-A and B-B of FIG. 2;

FIG. 12 illustrates recommended sub-content provided in a mobile terminal according to an example embodiment of the present disclosure;

FIGS. 22 and 23 illustrate a mobile terminal displaying sub-content according to an example embodiment of the present disclosure.

DETAILED DESCRIPTION

Figure 1:
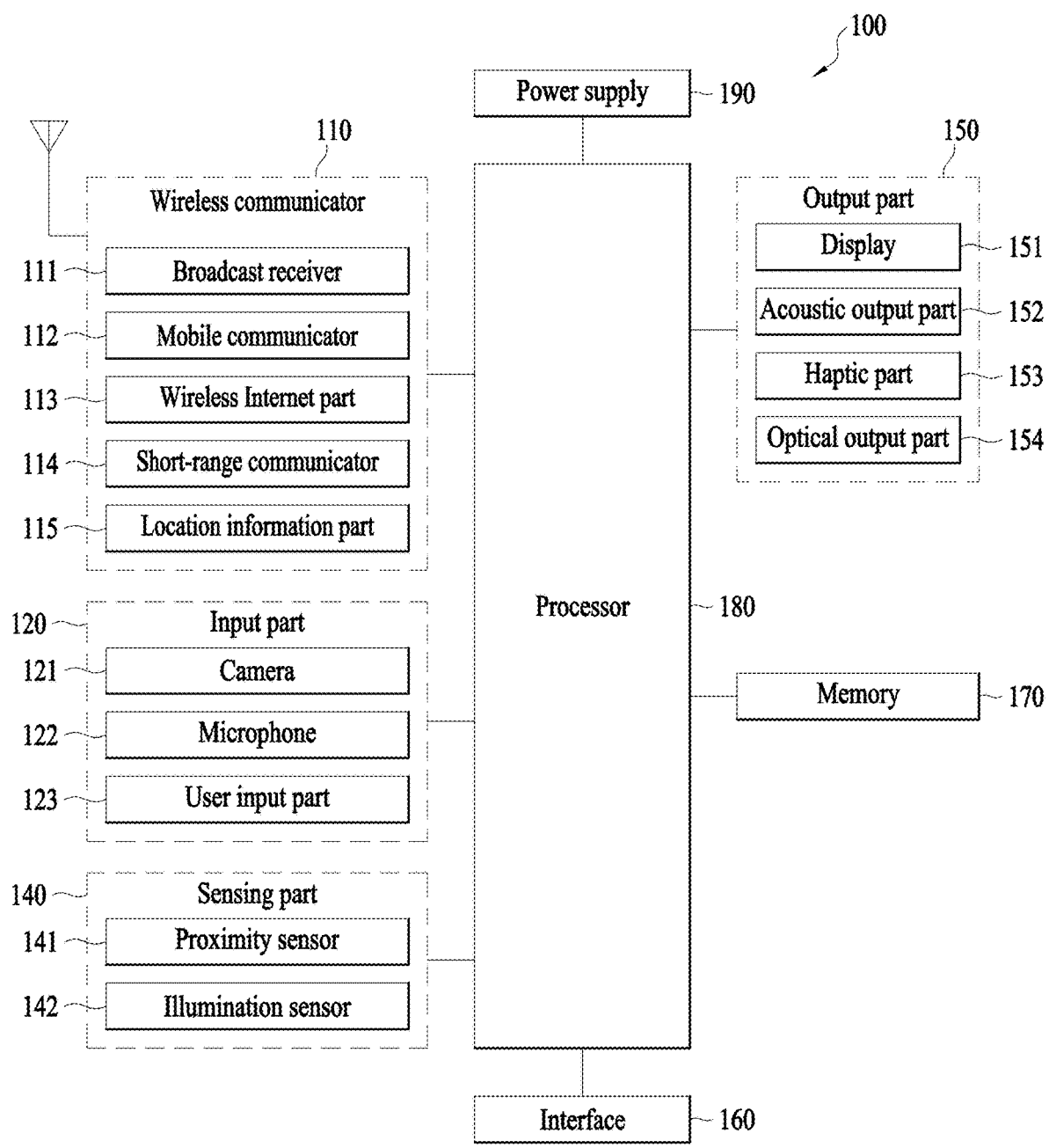
FIG. 1 is a block diagram illustrating a mobile terminal.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. It should be understood, however, that there is no intent to limit this disclosure to the particular example embodiments disclosed. Further, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating a mobile terminal (or electronic device) 100 related to an example embodiment of the present disclosure. The mobile terminal 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic apparatus, so the mobile terminal 100 described herein may have more or fewer components than those listed above.

Specifically, the wireless communication part 110 may include at least one module that enables wireless communication to be performed between the mobile terminal 100 and a wireless communication system, between the mobile terminal 100 and another mobile terminal 100, or between the mobile terminal 100 and an external server. The wireless communication part 110 may include one or more modules that connect the mobile terminal 100 to one or more networks.

The wireless communication part 110 may include at least one of a broadcast receiver 111, a mobile communication part 112, a wireless Internet part 113, a short-range communication part 114, and a position information part 115.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may also function as the user input part 123 that provides an input interface between the mobile terminal 100 and a user and simultaneously, provide an output interface between the mobile terminal 100 and the user.

The interface 160 may function as a passage to various types of external devices connected to the mobile terminal 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the mobile terminal 100 may perform an appropriate control associated with the connected external device.

The memory 170 may store data supporting various functions of the mobile terminal 100. The memory 170 may store application programs (or applications) run in the mobile terminal 100, data for operation of the mobile terminal 100, and instructions. At least a portion of the application programs may be downloaded from an external server through wireless communication. Also, at least a portion of the application programs may exist in the mobile terminal 100 for a basic function (for example, call forwarding and outgoing function and message receiving and outgoing function) of the mobile terminal 100 from the time of manufacture. The application program may be stored in the memory 170, installed in the mobile terminal 100, and run by the controller 180 to perform an operation (or function) of the mobile terminal.

The controller 180 generally controls an overall operation of the mobile terminal 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the mobile terminal 100.

The power supply 190 may supply power to each component included in the mobile terminal 100 by receiving external or internal power under a control of the controller 180. The power supply 190 may include a battery such as a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

Figure 3:
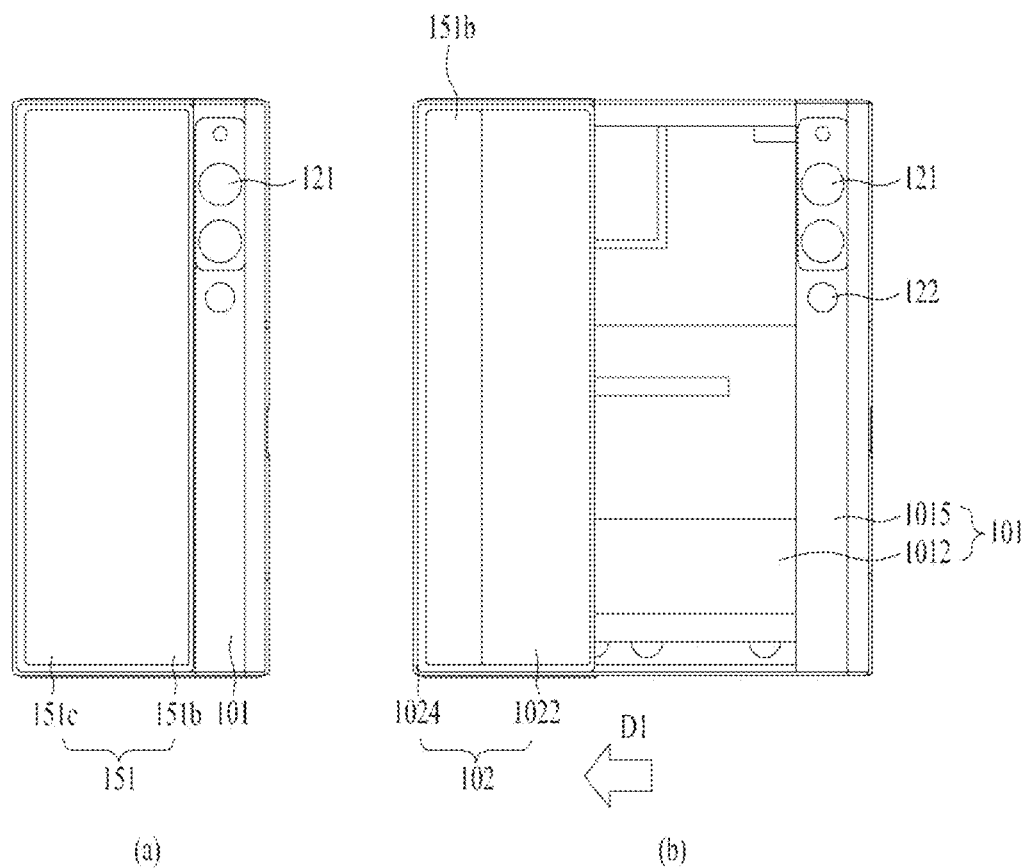
FIG. 3 illustrates rear views of a mobile terminal in a first state and a second state according to an example embodiment.

FIG. 2 illustrates front views of a mobile terminal in a first state and a second state, and FIG. 3 illustrates rear views of the mobile terminal in the first state and the second state. (a) of FIG. 2 and (a) of FIG. 3 illustrate the first state in which the mobile terminal is retracted. (b) of FIG. 2 and (b) of FIG. 3 illustrate the second state in which the mobile terminal is extended.

As illustrated, the mobile terminal 100 in the first state is retracted and has a smaller size when compared to the mobile terminal 100 in the second state. Also, in the first state, a display part or display 151 located at a front side of the mobile terminal 100 may be reduced in size when compared to the second state. The mobile terminal 100 may be extended in a first direction D1 in the first state to enter the second state. In the second state, as shown in (b) of FIG. 2, the size of the mobile terminal 100 and the size of the display 151 located at the front side may increase when compared to the first state. Also, in the second state, the size of the display 151 located at a rear side may be reduced as shown in (b) of FIG. 3. In other words, a display's portion located at the rear side of the mobile terminal 100 in the first state may move to the front side of the mobile terminal 100 in the second state.

In the following description, a direction in which the mobile terminal 100 and the display 151 thereof are extended or enlarged may be referred to as the first direction D1. In addition, a direction in which the mobile terminal 100 and the display 151 thereof are contracted, retracted, or reduced in the second state to enter the first state may be referred to as a second direction D2. Also, a direction vertical to the first direction D1 and the second direction D2 may be referred to as a third direction. The following description may be based on a case in which the first direction and the second direction are horizontal directions and the third direction is a vertical direction. In some cases, based on a placement of the mobile terminal 100, the first direction D1 and the second direction D2 may be vertical directions and the third direction may be a horizontal direction.

The display 151 may use the flexible display 151 to be bent so that a position of the display 151 is changeable. The flexible display 151 may be maintained in a flat state like a typical flat panel display and include a display (e.g., electronic paper) to be curved, bent, folded, twisted, or rolled like a paper. Also, the flexible display 151 may include a lightweight and durable display fabricated on a thin and flexible substrate. The flexible display 151 may be bendable in a predetermined direction like a paper and disposed such that a curvature is changed in the first direction.

The electronic paper may be a display technology based on characteristics of a general ink, and different from the typical flat panel display in using reflected light. The electronic paper may use a twist ball or electrophoresis using a capsule to change information.

In a state in which the flexible display 151 is not deformed (for example, a state having an infinite curvature radius, hereinafter, referred to as a default state), a display area of the flexible display 151 may be a plane. In the default state, when the flexible display 151 is deformed by an external force (for example, a state having a limited curvature radius, hereinafter, a deformed state), the display area may be a curved plane. As illustrated, information displayed in the deformed state may be visual information displayed on the curved plane. The visual information may be implemented by individually controlling light emission of sub-pixels arranged in a matrix form. The sub-pixel may be a minimum unit for implementing one color. When the external force is applied to the flexible display 151, the flexible display 151 may be changed from a flat state which is the default state to a curved state.

The flexible display 151 may implement a flexible touch screen in combination with a touch sensor. In response to a touch being input to the flexible touch screen, the controller 180 of FIG. 1 may perform a control corresponding to the touch input. The flexible touch screen may be configured to sense a touch input even in the deformed state as well as the default state.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The mobile terminal 100 may include a deformation detection means that detects a deformation of the flexible display 151. The deformation detection means may be included in the sensing part 140 of FIG. 1.

The deformation detection means may be provided in the flexible display 151 or a case (a first frame 101 and a second frame 102 described below) to sense information related to the deformation of the flexible display 151. The information related to the deformation may include, for example, a direction in which the flexible display is deformed, a degree of deformation, a deformed position, a deformation time, and an acceleration at which the deformed flexible display 151 is restored. In addition, the information related to the deformation may be various information to be detected in response to the flexible display 151 being bent.

Also, based on the information related to the deformation of the flexible display 151 detected by the deformation detection means, the controller 180 may change information displayed on the flexible display 151 or generate a control signal for controlling functions of the mobile terminal 100.

The deformation of the flexible display 151 may vary based on positions of the first frame 101 and the second frame 102. As illustrated in FIG. 2, since a bent position of the flexible display 151 is determined based on the positions of the first frame 101 and the second frame 102, a front-side exposed area and a bending-deformed position of the flexible display 151 may be calculated based on the positions of the first frame 101 and the second frame 102 instead of the deformation detection means of the flexible display 151.

A state change (to the first state or the second state) of the flexible display 151, for example, a size change of the display 151 occurring at the front side or the rear side of the mobile terminal 100 in response to a size change of the mobile terminal 100 may be manually performed by force applied by a user but not be limited to such a manual manner. For example, when the mobile terminal 100 or the flexible display 151 is in the first state, the mobile terminal 100 or the flexible display 151 may be changed to enter the second state by a command of the user or an application irrespective of the external force applied from the user. To automatically deform the flexible display 151 without applying the external force, the mobile terminal 100 may include a driving part 200 described below.

The flexible display 151 may be rolled and bent 180° with covering a first-direction side portion of the mobile terminal 100. Based on the side portion of the mobile terminal 100, a portion of the flexible display 151 may be located at the front side of the mobile terminal 100 and another portion of the flexible display 151 may be located at the rear side of the mobile terminal 100. For ease of description, the flexible display 151 located at the front side may be referred to as a front-side portion and the flexible display 151 located at the rear side may be referred to as a rear-side portion. The mobile terminal may extend in the first direction or retract in the second direction opposite to the first direction as illustrated in FIG. 2. In this case, an area of the flexible display 151 located at the front side may be changed. In other words, sizes of the front-side portion and the rear-side portion may be changed based on a state change of the mobile terminal.

A portion of the flexible display 151 located at the front side of the mobile terminal 100 may be unmovably fixed to a front side of the first frame 101 while another portion located at the rear side of the mobile terminal 100 is movably provided at the rear side.

The flexible display 151 may be rolled or released at a first-direction side portion of the mobile terminal 100. In this case, a portion located at the rear side of the mobile terminal 100 may be moved to adjust a size of an area of the flexible display 151 located at the front side of the mobile terminal 100. Since the area of the flexible display 151 is set and the flexible display 151 is configured as one continuous body, an area of the rear-side portion may be reduced when an area of the front-side portion is increased. The display 151 may be rolled in the second frame 102 that is movable relative to the first frame 101, for example, on a first-direction side portion of the second frame 102. Also, in order to adjust the area of the display 151 at the front side of the mobile terminal 100, the display 151 may be inserted or pushed into the second frame 102 or withdrawn or pulled out from the second frame 102 while being rolled up at the second frame 102 based on a moving direction of the second frame 102. Such operation will be further described below along with other related components of the mobile terminal 100.

In general, an antenna may be provided in a case or a housing of the mobile terminal 100. However, due to the flexible display 151 that covers the mobile terminal 100 from the front surface to a rear surface thereof, a part for mounting the antenna in the case or housing may be restricted. For this reason, the antenna may be embodied on the flexible display 151. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance. Also, the AOD may transmit or receive a signal directly to or from the display 151. Thus, the AOD may be used in the mobile terminal 100 in which the display 151 is located at both sides as described in the present disclosure.

Figure 4:
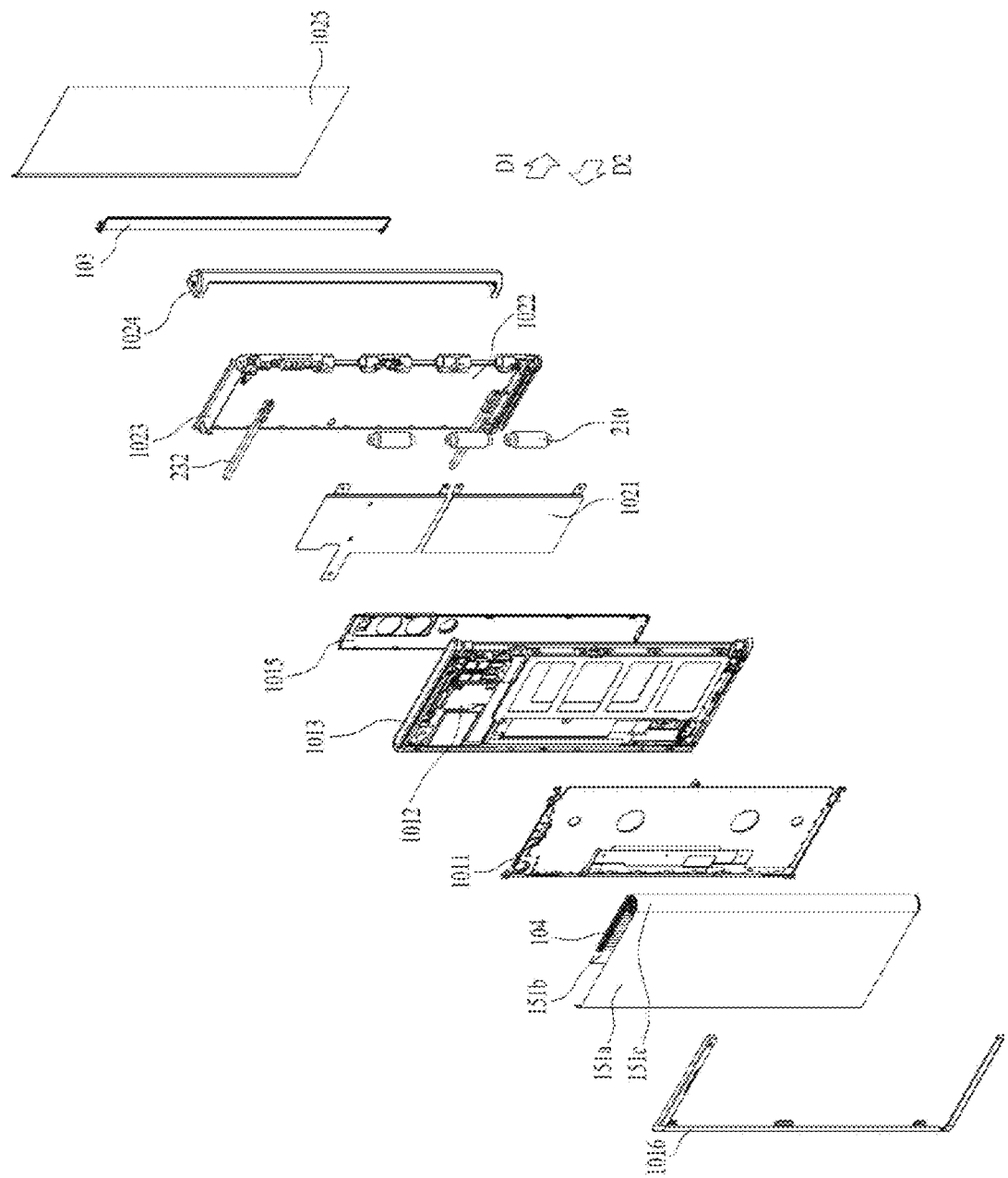
FIGS. 4 and 5 are exploded perspective views illustrating a mobile terminal according to an example embodiment.
Figure 5:
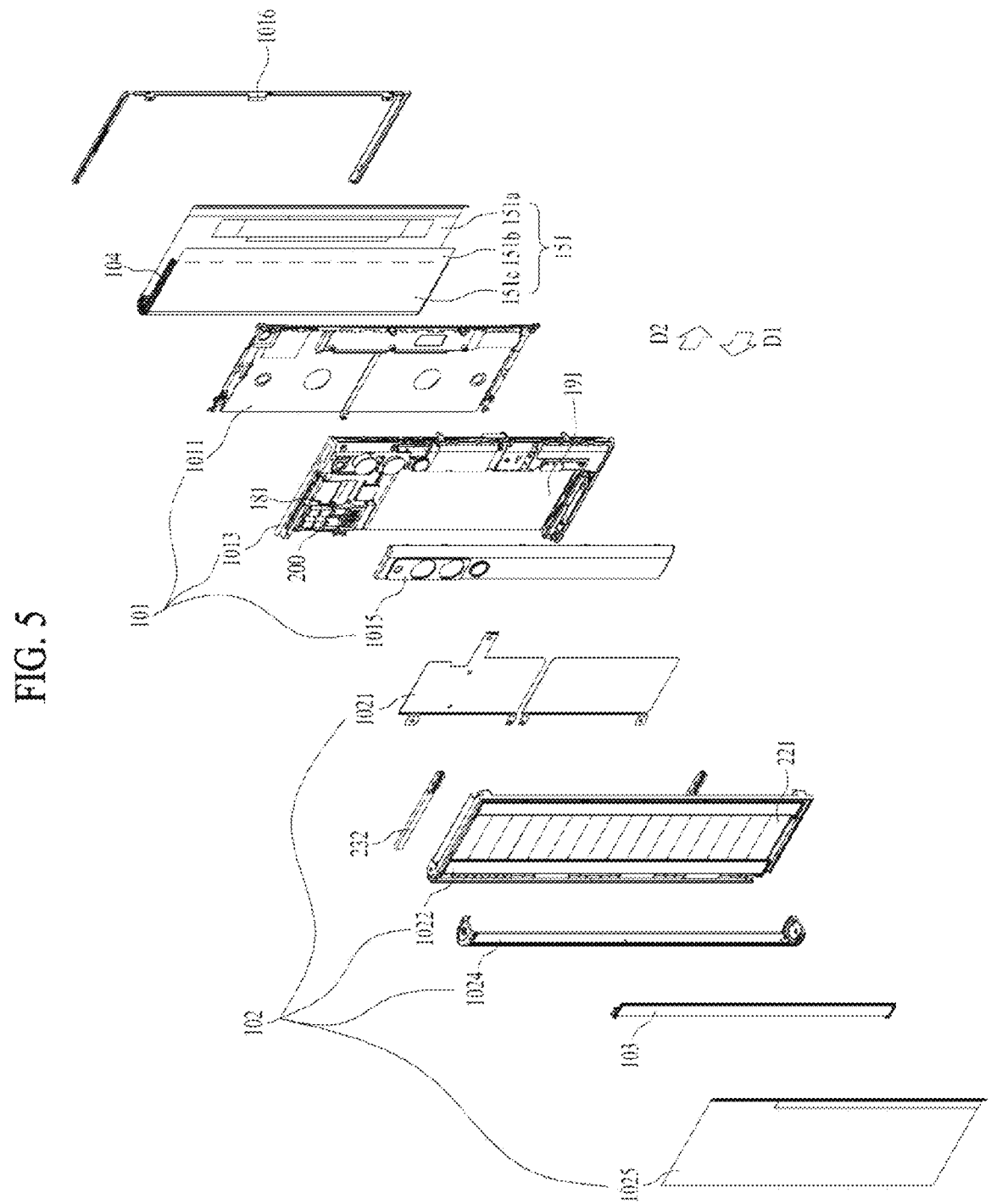

FIGS. 4 and 5 are exploded perspective views illustrating a mobile terminal according to an example embodiment. Specifically, FIG. 4 is an exploded perspective view illustrating a mobile terminal from a front-side direction and FIG. 5 is an exploded perspective view illustrating the mobile terminal from a rear-side direction.

The mobile terminal 100 of the present disclosure may include a frame, for example the first frame 101 and the second frame 102 to mount components therein. As illustrated in FIG. 2, the frame may be changed in size in the first direction. At least one frame may relatively move so as to be changed in size in the first direction. The frame may include an electronic component mounted therein. Also, the flexible display 151 may be located external to the frame.

Since the mobile terminal 100 of the present disclosure includes the flexible display 151, the flexible display 151 may be coupled in a form of covering a front side and a rear side of the frame. The frame may include the first frame 101 and the second frame 102 that moves relative to the first frame 101 in the first direction. The first frame 101 and the second frame 102 may each include a front portion, a rear portion, and a side portion and may be coupled to each other.

The first frame 101 may correspond to a main body of the mobile terminal 100 and have a space for accommodating components between a first front portion 1011 and a first rear portion 1012. Also, the first frame 101 may accommodate, in the space, the second frame 102 that is movably coupled to the first frame 101. Specifically, as illustrated in FIGS. 2 and 5, the first frame 101 may include the first front portion 1011 that is disposed in the front of the mobile terminal 100 to support the front-side portion of the display 151 and the first rear portion 1012 that is disposed in the rear of the mobile terminal 100 so that various components are mounted therein.

The first front portion 1011 and the first rear portion 1012 may be separated in a predetermined distance such that a predetermined space is formed therebetween. Also, the first front portion 1011 and the first rear portion 1012 may be connected by a first side portion 1013. The first side portion 1013 may be integrally formed with the first rear portion 1012 or the first front portion 1011. The camera 121, the acoustic output part 152, an input and output terminal, the controller 180, and the power supply 190 may be accommodated in the space of the first frame 101 as components of the mobile terminal 100. For example, the controller 180 may be a circuit board 181 including an electric circuit and a processor provided to control an operation of the mobile terminal 100. In addition, the power supply 190 may be a battery 191 and related components. Also, the below-described driving part 200 that controls a slide movement of the second frame 102 may be accommodated in the first frame 101.

As described above, the display 151 may have a continuous body and rolled in the mobile terminal 100 to be located both front side and rear side of the mobile terminal 100. The display 151 may include a front-side portion located at the front side of the mobile terminal 100, a rear-side portion located at the rear side of the mobile terminal 100, and a side portion located between the front-side portion and the rear-side portion to cover a side surface of the mobile terminal 100. The front-side portion and the rear-side portion of the display 151 may be flat and the side portion of the display 151 may be curved. When the side portion is bent to form an angle, the flexible display 151 may be damaged. Thus, the side portion may be provided to be bent with a predetermined curvature.

The display 151 may include a fixed portion and a variable portion. The fixed portion may be a portion fixed to a frame. Since the fixed portion is fixed at the frame, a bending degree of the fixed portion may not be changed so that the fixed portion is maintained in a predetermined shape. The variable portion may be a portion in which an angle or position of a bent portion is changeable. The variable portion may require a structure for supporting a rear surface of the variable portion in in accordance with a change in angle or position of the bent portion.

The fixed portion may be coupled to the first frame 101 of the display 151 and located at the front side so as to be a part of the front-side portion. The variable portion may include a side portion located in a direction to a side surface of the mobile terminal. In this case, a position of the side portion may be changed based on a position of the second frame 102. An area located at the front side and an area located at the rear side may be changed in size based on the side portion. For example, based on whether being in the first state or the second state, a portion of the variable portion may be the front-side portion and another portion may be the rear-side portion. The variable portion may be located in the first direction with respect to the fixed portion (e.g., a first area 151*a* and a second area 151*b*) based on the mobile terminal 100. An end portion of the variable portion may be bent in a direction to the rear side of the mobile terminal 100 and slidably move on the rear side of the second frame 102.

The end portion of the variable portion of the display 151 may be coupled to a sliding frame 103 that guides the end portion to slide on the rear side of the second frame. The sliding frame 103 may move on the second frame 102 in the first direction simultaneously when the second frame 102 moves in the first direction. As a result, the sliding frame 103 may move relative to the first frame 101 by a distance twice that of the second frame 102. Referring to FIG. 3, the first rear portion 1012 of the mobile terminal 100 may include an exposed rear portion 1015 that is not covered by the display 151 and is exposed outside even in the first state. In the exposed rear portion 1015, various buttons for manipulating the mobile terminal 100, switches, the camera 121, the physical input part 120 such as a flash, and the sensing part 140 such as the proximity sensor 141 and a fingerprint sensor may be arranged. The first rear portion 1012 except the exposed rear portion 1015 may be covered by display 151 in the first state as shown in (a) of FIG. 3 and exposed in the rear-side direction in the second state as shown in (b) of FIG. 3.

A typical bar-type terminal may provide a display on only a front side of the terminal. In such terminal, a main camera may be mounted on a rear side of the terminal to allow a user to capture an object facing a side opposite to the display while the user is viewing the object through the display. To allow the user to capture himself or herself while viewing through the display, another camera may be additionally required on a front side of the terminal.

In the present disclosure, the display 151 may be located at both front side and rear side of the mobile terminal 100. When the user captures himself or herself, the display 151 on the same side as the camera 121, that is, the rear-side portion of the display 151 may be used. When the user captures an object facing the side opposite to the user, the front-side portion of the display 151 located on the side opposite to the camera 121 may be used. Through this, the mobile terminal 100 may capture the user and the object facing the side opposite to the user using the single camera 121. The camera 121 may include a plurality of cameras having different angles of view such as a wide angle, an ultra-wide angle, a telephoto, and the like. In addition to the camera 121, a proximity sensor, an acoustic output part, and the like may be located on the exposed rear portion 1015. Also, the antenna 116 may be installed thereto. In view of exterior design, an exposure decoration may be attached to protect the camera and sensor of the exposed rear portion 1015. In the exposure decoration, a portion corresponding to the camera 121 or the sensing part 140 may be configured to be transparent and another portion may have a predetermined pattern or color in consideration of design so internal components are not be exposed.

The first side portion 1013 may extend along edges of the first front portion 1011 and the first rear portion 1012 to cover a perimeter of the first frame 101 and form an appearance of the mobile terminal 100. As described above, since the second frame 102 is accommodated in the first frame 101 and movably coupled thereto, a portion of the first frame 101 may be open to allow a relative movement of the second frame 102 with respect to the first frame 101.

Referring to FIG. 2, because the second frame 102 is movably coupled to the first frame 101 in the first direction, the first side portion 1013 may not be formed on the first-direction side surface and thus, may be open. Since the first side portion 1013 is exposed external to the mobile terminal 100, the interface 160 for connecting a power port or an ear jack, or the user input part 120 such as a volume button may be disposed therein. When including a metal material, the first side portion 1013 may serve as an antenna.

The second frame 102 may include a second front portion 1021 located in the front of the mobile terminal 100 and a second rear portion 1022 located in the rear of the mobile terminal 100. Like the first front portion 1011 and the first rear portion 1012 of the first frame 101, the second front portion 1021 and the second rear portion 1022 may be formed as substantially flat panel members. The second frame 102 may accommodate various components and may not interfere with the components accommodated in the first frame 101 during the movement. The second front portion 1021 and the second rear portion 1022 may be coupled to each other so that a predetermined space is formed therebetween. Also, the second front portion 1021 and the second rear portion 1022 may be shaped not to interfere with the components included in the first frame 101.

FIG. 6 illustrates side views of the mobile terminal 100 from the third direction. FIG. 6 illustrates the first side portion 1013 of the first frame 101 and a second side portion 1023 of the second frame 102. A first-direction end portion of the second frame 102 may not be exposed outside since the flexible display 151 is located. Also, a second-direction end portion of the second frame 102 may be open to prevent interference with the first frame 101. The second side portion 1023 of the second frame 102 located in the third direction (in the drawings, an upper or lower direction or including both upper and lower directions) may overlap the first side portion 1013 of the first frame 101 not to be exposed outside in the first state. In the second state, however, the second side portion 1023 may be exposed outside because the second frame 102 is pulled out.

The display 151 may be rolled in the second frame 102 and bent at 180° so as to be located at both front and rear sides of the mobile terminal 100. For such arrangement of the display 151, the second frame 102 may include a roller 210 rotatably disposed therein. The roller 210 may be disposed at a predetermined position in the second frame 102. To provide a high-quality display to a user, the display 151 may be flatly spread on the front side and the rear side of the mobile terminal 100. For this, a sufficient tensile force may be provided to the display 151. To provide the sufficient tensile force, the roller 210 may be disposed at the first-direction end portion of the second frame 102. The roller 210 may be extended in the second direction and rotatably coupled to the second frame 102.

The display 151 may be gently bent with a predetermined curvature to be rolled on the roller 210. The flexible display 151 may include a first surface exposed outside to display an image and an inner surface facing a frame on the other side. The roller 210 may be installed in the second frame 102 to be freely rotatable while contacting the inner surface of the display 151. Practically, the roller 210 may move the display 151 in a lateral direction, that is, a direction vertical to a longitudinal direction of the mobile terminal 100. As described below, when the second frame 102 slides, the display 151 having a direction (e.g., the first direction D1 or the second direction D2) different from and relative to the second frame 102 may be moved to the front side or the rear side of the mobile terminal 100 by the tensile force applied from the second frame 102. In this instance, the roller 210 may guide the movement of the display 151 while rotating.

The roller 210 may be disposed adjacent to the first-direction end portion of the second frame 102 and include a side frame 1024 disposed at the first-direction end portion of the second frame 102 to prevent damage to the display 151 rolled on the roller 210.

The side frame 1024 may extend in the longitudinal direction of the second frame 102 (e.g., the third direction) to cover the first-direction side portion, so as to protect the roller 210 and the display 151 rolled thereon. Also, the side frame 1024 may be relocated based on a state of the mobile terminal 100. The side portion may have a predetermined curvature and be rolled by the roller 210. An inner surface of the side frame 1024 may include a curved surface corresponding to the curvature of the side portion.

The side frame 1024 may substantially form an appearance of the mobile terminal 100 along with the first side portion 1013 of the first frame 101. Also, to minimize interference with the components of the first frame 101 during the movement, a second-direction side portion of the second frame 102 may be omitted.

During expansion and retraction in the first direction D1 and the second direction D2, the second frame 102 may overlap the first frame 101, for example, the first front portion 1011 and the first rear portion 1012 of the first frame 101 to prevent the interference with the first frame 101. Specifically, as described above, the display 151 may be coupled to the first front portion 1011 of the first frame 101 and supported by the first front portion 1011. Thus, the display 151 may not be additionally supported by the second front portion 1021 of the second frame 102.

When the second front portion 1021 is located between the first front portion 1011 and the display 151, the display 151 may be deformed or damaged due to a friction with the second front portion 1021 moving repetitively. To prevent this, the second front portion 1021 may be disposed below the first front portion 1011 or inserted between the first front portion 1011 provided as two pieces. The second rear portion 1022 of the second frame 102 may be disposed in a rear-side direction of the first rear portion 1012 of the first frame 101. For example, a front side of the second rear portion 1022 may face a rear side of the first rear portion 1012. Also, to stably support a motion of the second frame 102, the rear side of the first rear portion 1012 may contact the front side of the second rear portion 1022. In such arrangement, the second rear portion 1022 may be exposed external to the first frame 101, for example, external to the first rear portion 1012 and coupled to the display 151.

The second frame 102 may extend and retract in the first and second directions D1 and D2 such that a size of the mobile terminal 100, for example, a size of the front side of the mobile terminal 100 is increased or reduced. In this instance, to obtain the intended first and second states, the display 151 may be moved based on the increased or reduced portion of the front side. When the display 151 is fixed to the second frame 102, the display 151 may not be moved in response to the front side of the mobile terminal 100 being extended or retracted. For this reason, the display 151 may be movably coupled to the second frame 102.

Specifically, the display 151 may include the first area 151*a* located at the front side of the mobile terminal 100 and the second area 151*b* coupled to the sliding frame 103 located at the rear side of the mobile terminal 100. The display 151 may also include a third area 151*c* located between the first area 151*a* and the second area 151*b*. The third area 151*c* may be bent to cover the roller 210 and may move to the front side or the rear side based on a state change of the mobile terminal 100. The sliding frame 103 may be provided as a panel-type member that extends in the longitudinal direction of the mobile terminal 100 (e.g., the third direction) and may be coupled to the second rear portion 1022 to be movable in the first direction D1 and the second direction D2.

The first area 151*a*, the second area 151*b*, and the third area 151*c* may be connected to one another and form a continuous body of the display 151. Also, as described above, to allow the third area 151*c* to move to the front side or the rear side of the mobile terminal 100 based on a moving direction of the second frame 102, the first area 151*a* may be unmovably fixed to the front side of the mobile terminal 100 and the second area 151*b* may be movably provided on the rear side of the mobile terminal 100. Such configuration of the display 151 will be described in detail below.

The first area 151*a* may be located at the front side of the mobile terminal 100, for example, the front side of the first front portion 1011 of the first frame 101. The first area 151*a* may be fixed to the front side of the first frame 101, for example, the front side of the first front portion 1011 so as not to move even when the second frame 102 moves. Through this, the first area 151*a* may always be exposed at the front side of the mobile terminal 100.

The third area 151*c* may be adjacent to the first area 151*a*. The third area 151*c* may extend into the second frame 102 to be rolled on the roller 210. Continually, the third area 151*c* may extend out of the second frame 102 and partially cover the second frame 102, for example, the rear side of the second rear portion 1022. Meanwhile, since the second frame 102, that is, the second rear portion 1022 is adjacent to the first frame 101, for example, the first rear portion 1012 and forms a rear case of the mobile terminal 100 together, it can be understood that the third area 151*c* is also arranged at the rear side of the first frame 101.

The second area 151*b* may be adjacent to the third area 151*c* and located at the rear side of the mobile terminal 100, for example, the rear side of the second rear portion 1022 of the second frame 102. The second area 151*b* may be coupled to the sliding frame 103 instead of being coupled directly to the second frame 102.

As a result, the first area 151*a* may be located at the front side of the mobile terminal 100 to be always exposed at the front side irrespective of the movement of the second frame 102. Also, the second area 151*b* may be located at the rear side of the mobile terminal 100 to be always exposed at the rear side irrespective of the movement of the second frame 102. The third area 151*c* may be between the first and second areas 151*a* and 151*b* and selectively arranged at the front side or the rear side of the mobile terminal 100 based on the moving direction (e.g., D1, D2) of the second frame 102.

In such a selective arrangement of the third area 151*c*, since the third area 151*c* moves to the front side of the mobile terminal 100 and the second rear portion 1022 moves in the first direction D1 in the second state, a first rear portion 1012's portion which is covered by the second area 151*b* and the third area 151*c* of the display 151 and the second rear portion 1022 in the first state may be exposed external to the mobile terminal 100. Also, in the first state, the second front portion 1021 of the second frame 102 may be disposed hidden by the first front portion 1011 of the first frame 101. In the second state, however, the second front portion 1021 may be moved out of the first frame 101 to support the third area 151*c* of the display 151 located at the front side of the mobile terminal 100.

A separating plate may be further provided to prevent the second front portion 1021 from affecting inside components during the sliding movement. The separating plate may be located in a rear-side direction of the second front portion 1021 and coupled to the first front portion 1011. The second front portion 1021 may move between the first front portion 1011 and the separating plate in response to the slide movement of the second frame 102.

The third area 151*c* may be rolled on the roller 210 in the second frame 102 to be curved. When the first state is changed to the second state, the third area 151*c* may extend from the second frame 102 to the front side of the mobile terminal 100 while being rolled on the roller 210 in one direction. When the second state is changed to the first state, the third area 151*c* may be rolled on the roller 210 in a reverse direction to retract from the front side of the mobile terminal 100 to the second frame 102. Simultaneously, the third area 151*c* may return from the second frame 102 to the rear side of the mobile terminal 100.

An opening-book-type foldable mobile terminal may be repetitively folded at a predetermined position and thus, easily damaged at the position. In contrast, a deformed portion of the flexible display 151, that is, a portion to be rolled on the roller 210 may vary based on the first and second state of the mobile terminal 100, that is, the movement of the second frame 102. As such, the mobile terminal 100 of the present disclosure may significantly reduce deformation and fatigue repetitively applied to a predetermined portion of the display 151 so that the damage to the display 151 is prevented.

Based on the above-described configuration, an overall operation of the mobile terminal 100 will be described as follows. In one example, a state transition may be performed manually by a user, and an operation of the mobile terminal 100 performed during such a manual state transition will be described. However, the below-described operations of the first to third frames 101 to 103 and the display 151 may be equally performed even when a power source other than user's power is used, for example, the driving part 200 is applied as described later.

A rear cover 1025 may be further provided on the rear side of the second rear portion 1022 to prevent an external exposure of the rear-side portion of the display 151 located at the rear side of the mobile terminal 100. When the rear cover 1025 includes a transparent material, the rear-side portion may also be used even in the first state. When an opaque material is used for the rear cover 1025, the rear cover 1025 may cover the sliding frame 103 such that the moving of the sliding frame 103 is not exposed outside. The sliding frame 103 and the second and third areas of the display 151 may move in the first direction and the second direction in a space between the second rear portion 1022 and the rear cover 1025.

FIG. 7 illustrates the driving part 200 of the mobile terminal 100 according to an example embodiment. The mobile terminal 100 of the present disclosure may change a state of the mobile terminal 100 using a method in which a user manually pulls the second frame 102 out of the first frame 101 in the first direction or pushes the second frame 102 into the first frame 101 in the second direction. However, the manual method may cause damage when an excessive force is applied to a main body of the mobile terminal 100. Thus, the mobile terminal 100 may further include the driving part 200 using a motor 201 to stably move the second frame 102 without twisting.

The motor 201 may use the motor 201 that provides a rotating force as illustrated in FIG. 7 and may also use a linear motor that performs a rectilinear motion. To increase the rotating force provided by the motor 201, a diameter of the motor 201 may also be increased. Referring to FIG. 7, two motors 201 may be used to provide a predetermined intensity of driving force or more while preventing an increase in thickness in a restricted space of the mobile terminal 100. The second frame 102 moving too fast may lead to damage or false operation. Thus, a planetary gear may be further provided to reduce the speed of the motor 201 so the motor 201 moves at a stable speed. A planetary gear 202 may serve to amplify or attenuate a number of revolutions of the motor 201 using a plurality of disc gears with different numbers of teeth.

The motor 201 may be fixed to the first frame 101 as shown in (a) of FIG. 7. Also, as shown in (b) of FIG. 7, a position of the motor 201 may be fixed even when the mobile terminal 100 enters the second state in response to the second frame 102 moving in the first direction.

Since the second frame 102 linearly moves in the first direction or the second direction with respect to the first frame 101, a rack and pinion that converts a rotating force of the motor 201 into the linear motion may be used. A pinion gear receiving the rotating force of the motor 201 may be arranged to engage with a rack gear 205 having teeth consecutively arranged in the first direction. The pinion gear may be fixed to the first frame 101 along with the motor 201, and the rack gear 205 may be located at the second frame 102. Conversely, the first frame 101 may also be located at the rack gear 205, and the pinion gear may also be located at the second frame 102 along with the motor 201. Since the pinion gear is caught by the motor 201 so as not to rotate, the second frame 102 may be maintained in the first state and the second state. However, when a large external force is applied, the pinion gear may rotate, which may lead to a displacement of the second frame 102.

Although not shown, a stopper may be further provided to fix a position between the first frame 101 and the rack gear 205 or the second frame 102 so the mobile terminal 100 is fixedly in the first state or the second state. When the motor 201 is driven in response to current being applied, the stopper may be released to allow movement of the second frame 102. When current is not applied so the motor 201 does not rotate, the stopper may be engaged to fix the second frame 102 and a position of the second frame 102.

When the driving part 200 is provided as a pair of driving parts symmetrically disposed in a vertical direction (e.g., the third direction) the driving part 200 may stably move. However, to arrange a battery and the like in consideration of a limited mounting space of the mobile terminal 100, the driving part 200 may be disposed biasedly on one side as shown in (a) of FIG. 7. In some cases, due to such an asymmetric position of the driving part 200, an upper portion and a lower portion of the second frame 102 may move at different speeds so the second frame 102 is twisted. To prevent this, a linear guide 230 may be further provided in the mobile terminal 100.

The linear guides 230 may be provided in both third-direction ends, for example, an upper side and a lower side of the mobile terminal 100 to complement a function of the driving part 200 disposed biasedly on the one side. The linear guide 230 may include a guide rail 231 extended in the first direction and a guide block 232 moving along the guide rail 231. The guide rail 231 may be disposed on the first frame 101 and the guide block 232 may be disposed on the second frame 102, and vice versa. In the present embodiment, the guide rail 231 may be disposed on the second frame 102 to cover upper and lower side surfaces of an extended portion of the second frame 102 in the second state.

The guide block 232 may be coupled to the first frame 101, the guide rail 231 may be coupled to the second frame 102, and then the guide block 232 and the guide rail 231 may be slidably coupled. For the convenience of installation, in a state of the guide block 232 and the guide rail 231 are coupled, the guide block 232 may be fixed to the first frame 101, and then the second frame 102 may be coupled to the guide rail 231.

The guide block 232 may include a guide groove into which the guide rail 231 is inserted. The guide rail 231 may include a rail groove into which a portion of the guide block 232 is inserted. Projections may be formed on a fastening portion of the guide block 232 and the guide rail 231 so the guide rail 231 and the guide block 232 move in the first direction or the second direction without deviating in a thickness direction of the mobile terminal 100. To reduce a friction between the guide block 232 and the guide rail 231, a member formed of a material having a high wear resistance, a low friction resistance, and a self-lubricating property such as polyoxymethylene (POM) or a bearing may be added inside the guide groove.

FIG. 8 illustrates cross-sectional views taken along lines A-A and B-B of FIG. 2. Specifically, (a) of FIG. 8 is a cross-sectional view taken along the line A-A of FIG. 2 and (b) of FIG. 8 is a cross-sectional view taken along the line of FIG. 2. As illustrated in FIG. 2, when the second frame 102 moves in the first direction and enters the second state, the third area 151c located in the rear-side direction may move in the front-side direction. In this case, a structure for supporting the rear side of the third area 151c moved to the front side may be required. The second front portion 1021 located at the front side of the second frame 102 may be located at the rear side of the third area 151c in the second state. However, because the second front portion 1021 may overlap the first front portion 1011 of the first frame 101 in the first state, the first front portion 1011 and the second front portion 1021 may have a level difference therebetween. The level difference between the first front portion 1011 and the second front portion 1021 may create a boundary between the first area 151a and the third area 151c of the flexible display 151. A rolling plate 104 may be used as a support structure for filling a space between the second front portion 1021 and the third area 151c of the flexible display 151.

The rolling plate 104 may be located at the rear side of the flexible display 151 and may have a thickness corresponding to a space between the second front portion 1021 and the flexible display 151 in the second state. As shown in (a) of FIG. 8, in the first state, the rolling plate 104 may be rolled on the roller 210 and located in a direction to the side surface and the rear side of the mobile terminal 100. Also, the flexible display 151 and the rolling plate 104 may be located between the rear cover 1025 covering the rear-side portion of the display 151 and the second rear portion of the second frame 102. As shown in (b) of FIG. 8, when switching to the second state, the rolling plate 104 may move to the front side and thus, located in a front portion of the second frame 102.

The third area 151c in which the rolling plate 104 is located may be a portion in which bending deformation occurs when the first state is changed to the second state. Thus, the rolling plate 104 may be deformed based on the deformation of the third area 151c. Simultaneously, the rolling plate 104 may have a predetermined stiffness such that the flexible display 151 is maintained as being flat when the flexible display 151 is located at the front side or the rear side. As such, the rolling plate 104 may require a structure to be maintained as being flat in the third direction and to be bending-deformable in the first direction.

Figure 9:
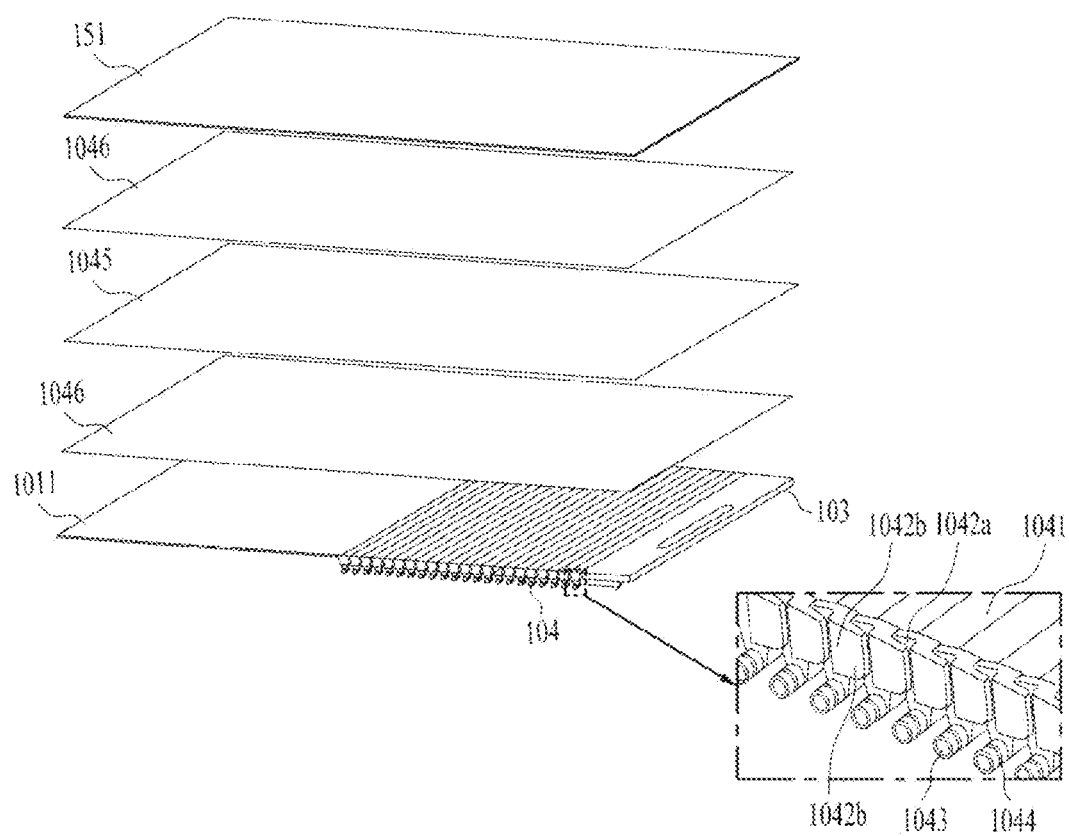
FIG. 9 illustrates a display part and a rolling plate of a mobile terminal according to an example embodiment.

FIG. 9 illustrates the rolling plate 104 and the display 151 of the mobile terminal 100 according to an example embodiment. The rolling plate 104 may include a plurality of support bars 1041 extended in the third direction. The plurality of support bars 1041 may be arranged in parallel in the first direction at preset intervals. Through such arrangement, even when the flexible display 151 is rolled on the roller 210 to be bent, the plurality of support bars 1041 may be prevented from interfering with each other. The support bar 1041 may be implemented as an injection-molded object having a predetermined thickness to achieve the stiffness and may include a metal material such as stainless steel (SUS), for example.

The plurality of support bars 1041 may be directly attached to the rear side of the display 151. In this case, however, it may take a long time and a lot of defects, which may decrease productivity. Also, in a case of directly processing the display 151, the display 151 may be easily damaged. To prevent this, the mobile terminal 100 may further include a rolling sheet 1045 to fix the plurality of support bars 1041. The rolling sheet 1045 may include a metal material, and may use a material having ultra-elasticity to be bending-deformed and maintained as being flat after the bending deformation.

For example, an ultra-elastic metal sheet such as a thin STS sheet having a thickness of 0.05 millimeters (mm) or less may be used. To attach the support bar 1041 to the rolling sheet 1045 and attach the rolling sheet 1045 to the rear side of the display 151, an adhesive tape may be applied to both sides of the rolling sheet 1045.

The rolling sheet 1045 may have a kerf pattern in which a groove extending in the third direction is provided in plural in the first direction. The grooves of the kerf pattern may be formed between the plurality of support bars 1041. Also, desirably, the grooves may be formed in a side on which the support bars 1041 are attached to the rolling sheet 1045. The kerf pattern may be formed in a wedge shape such that a size is large in a surface part of the rolling sheet 1045 and narrowed gradually.

Instead of using the rolling sheet 1045, a material having elasticity such as silicon may be disposed between the support bars 1041 to couple the neighboring support bars 1041 so an angle between the support bars 1041 varies. An elastic connecting part may be bent at a position corresponding to the roller 210 and if located at the front side or the rear side, may stretch so that the support bars 1041 are arranged to form a plane.

The support bars 1041 may form a flat plane corresponding to the rear side of the display 151. Also, as shown in (b) of FIG. 8, the support bars 1041 may form a curved plane with a predetermined curvature. The support bars 1041 of the curved plane may be in close contact with a curved surface of the roller 210 when the rolling plate 104 is rolled on the roller 210.

In some cases, the support bars 1041 may form a plane having one flat surface in contact with the display 151 and the other surface curved with a curvature corresponding to the curvature of the roller 210. In such cases, the support bars 1041 may have maximal thicknesses at a first-directional end and a second-directional end and have a minimum thickness at a center.

The rolling plate 104 may be located at a position corresponding to the third area 151*c*, and rolled and bent over the roller 210 to span the front side and the rear side. The rolling plate 104 may be connected to the first front portion 1011 of the first frame 101 in the front-side direction and connected to the sliding frame 103 in the rear-side direction. In order for the flexible display 151 to form a continuous surface without a level difference, the first front portion 1011 of the first frame 101 located at the rear side of the first area 151*a*, the sliding frame 103 located at the rear side of the second area 151*b*, and the rolling plate 104 located at the rear side of the third area 151*c* may contact the display 151 at the same height. For example, since the sliding frame 103 moves on the rear side of the mobile terminal 100 and moves in the same space as the rolling plate 104, the rolling plate 104 may have a thickness corresponding to that of the sliding frame 103.

Figure 10:
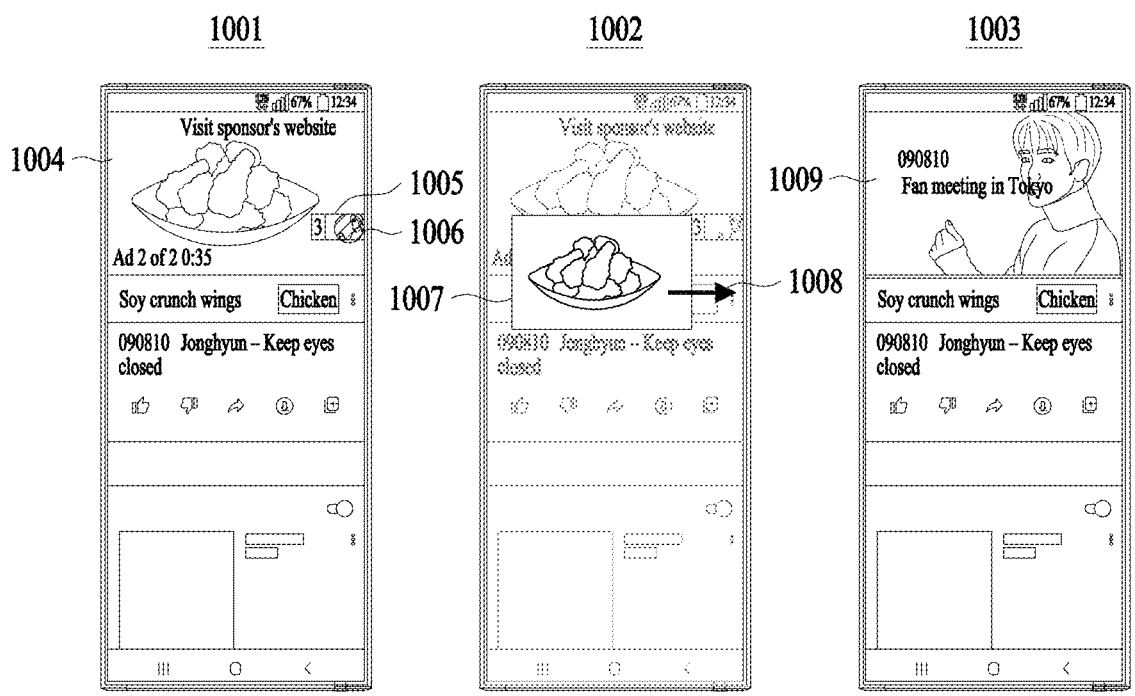
FIGS. 10 and 11 illustrate an operation of a mobile terminal according to an example embodiment of the present disclosure.
Figure 11:
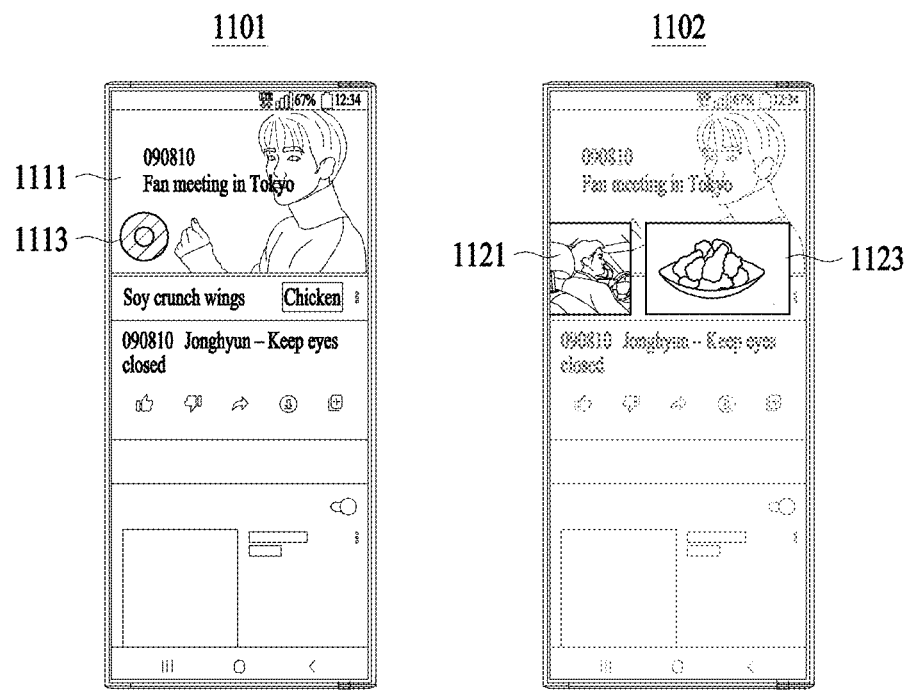

FIGS. 10 and 11 illustrate an operation of a mobile terminal according to an example embodiment of the present disclosure. Specifically, FIGS. 10 and 11 are diagrams illustrating an operation of identifying sub-content from content related to a first application.

Referring to FIG. 10, as indicated by reference numerals 1001, 1002, and 1003, a first area of a display may sequentially change in accordance with one sub-content being identified. The first area may include at least a portion of the display located at a first side of the mobile terminal.

Referring to the reference numeral 1001, in accordance with the first application being executed, content related to the first application may be displayed in the first area of the display. The content may include sub-content 1004. The first application may include, for example, an application for playing a video. However, it is merely an example and the first application may include various applications for providing content on a display. The content related to the first application may include at least one sub-content (e.g., the sub-content 1004) and general content. The at least one sub-content may include advertisement content provided based on an execution of the first application. Also, sub-content may include content provided from a server related to the mobile terminal. The first application may provide a layer for displaying the sub-content. Content displayed on the layer may be determined through a control of an application or an operating system of the mobile terminal. For example, the at least one sub-content may include an advertisement image or advertisement video. The general content may be content provided by the first application in association with a function of the first application. The general content may include, for example, at least one of video content, text content, and image content.

When the content related to the first application includes video content, the video content in which the sub-content 1004 is inserted may be provided. For example, when a playback time of the video content is about 60 seconds, the sub-content 1004 may be inserted before, during, or after the playback time of the video content. In this example, as indicated by the reference numeral 1001, the sub-content 1004 may be displayed in the first area based on a point in time for insertion of the sub-content 1004 in association with the playing of the video content.

As indicated by the reference numeral 1001, in some cases, the sub-content 1004 may include a first icon 1005. The first icon 1005 may include information (or icon, content) indicating information on a period of time in which displaying of an advertisement is maintained and an icon for suspending displaying the advertisement in response to a corresponding input. Also, the first icon 1005 may include an icon for selecting sub-content in response to a corresponding input being received.

When a first input 1006 to the first icon 1005 is applied, the mobile terminal may identify the sub-content 1004 and display at least a portion 1007 of the sub-content 1004 in the first area as indicated by the reference numeral 1002. In this case, in the first area, a remaining area other than at least the portion 1007 of the sub-content 1004 may be inactivated or a layer may be added to the remaining area as indicated by the reference numeral 1002. Here, the first input 1006 may be a predetermined input including, for example, a touch input or a long-press input, but is not limited thereto.

Referring to the reference numeral 1002, the mobile terminal may receive a second input 1008 related to the sub-content 1004. For example, the second input 1008 may correspond to at least the portion 1007 of an area in which the sub-content 1004 is displayed. The second input 1008 may be a predetermined input including, for example, a touch input moving in a first direction, but is not limited thereto.

Although not shown, when the second input 1008 is received, the mobile terminal may display the sub-content 1004 through a second area of the display or store information related to sub-content. The second area may include, for example, at least a portion of the display located at a second side of the mobile terminal. When the sub-content 1004 is stored, the mobile terminal may appropriately provide the stored sub-content 1004 on the display of the mobile terminal based on an applied input or a state of the mobile terminal. Related description will be made later.

In response to the second input 1008, the sub-content 1004 may be separated from the content related to the first application of the first area. Through this, as indicated by the reference numeral 1003, displaying of the sub-content 1004 may be omitted and another content related to the first application may be displayed in the first area.

Referring to FIG. 11, when a plurality of sub-contents is identified, a first area of a display may sequentially change as indicated by reference numerals 1101 and 1102. Specifically, the reference numeral 1101 represents a case in which content related to a first application is displayed in a first area based on an execution of the first application. The content related to the first application may include at least one sub-content and general content. Since the at least one sub-content and the general content have been described with reference to FIG. 10, repeated description will be omitted.

Referring to the reference numeral 1101, when the content related to the first application is provided, a third input 1113 may be applied to correspond to at least a portion 1111 of the provided content. The third input 1113 may be a predetermined input including, for example, an input for selecting one or more sub-contents from at least one sub-content. That is, the third input 1113 may correspond to one or more sub-contents of at least one sub-content. When the third input 1113 is received, the mobile terminal may identify sub-content corresponding to the third input 1113.

FIG. 11 illustrates a case in which the third input 1113 is applied in response to general content being displayed. However, it is merely an example and the third input 1113 may be applied in a case in which a portion of at least one sub-content is displayed. In this case, the mobile terminal may identify one or more sub-contents corresponding to the third input 1113 from at least one sub-content based on reception of the third input 1113.

For example, when the third input 1113 is a predetermined input applied to general content corresponding to video content, the mobile terminal may identify all sub-contents included in the video content.

Referring to the reference numeral 1102, the mobile terminal may display at least one of the identified one or more sub-contents in the first area based on the identification of the one or more sub-contents. As illustrated, the mobile terminal may display identified sub-contents, for example, first sub-content 1121 and second sub-content 1123 in the first area. In this case, an area of the first area other than areas in which the first sub-content 1121 and the second sub-content 1123 are displayed may be inactivated or another layer may be displayed to overlap the area.

When a plurality of sub-contents is identified, a portion of the identified sub-contents may be displayed in the first area. In this case, when a predetermined input (e.g., a sliding input and a drag input) for requesting omitted sub-content to be displayed is applied, a portion of the omitted sub-content may be displayed in the first area.

Although not shown, the mobile terminal may display at least a portion of the identified sub-contents through a second area of the display or store at least a portion of the identified sub-content. As an example, the mobile terminal may display sub-content selected from the identified sub-contents based on an input of the user, through the second area of the display. As another example, the mobile terminal may display all the identified sub-contents through the second area of the display.

The sub-content stored or displayed through the second area may be omitted in the first area.

FIG. 12 illustrates recommended sub-content provided in a mobile terminal according to an example embodiment of the present disclosure. Specifically, FIG. 12 illustrates content displayed in response to sub-content being identified as described with reference to FIG. 10 or 11.

Reference numeral 1201 of FIG. 12 sequentially shows a first area of a display located at a first side and a second area of the display located at a second side based on an identification of sub-content. As indicated by the reference numeral 1201, when first sub-content having been displayed in the first area is identified, displaying of the first sub-content may be suspended or omitted in the first area and at least a portion 1221 of the first sub-content may be displayed in the second area.

As illustrated, a screen brightness of at least a portion of the first area may be adjusted to decrease in response to the identification of the first sub-content. However, it is merely an example, and touch input sensing for the first area may be deactivated or content playback may be suspended.

The reference numeral 1201 may represent the first area and the second area of the display in a case in which the first sub-content is identified and the second area of the mobile terminal is activated. Here, the activation of the second area may be performed, for example, in a case in which a pose of the mobile terminal corresponds to a predetermined pose (e.g., an orientation in which the second area faces a front side), a case in which a pose of the mobile terminal corresponds to a predetermined range, or a case in which a predetermined input (e.g., a long-press input or an input corresponding to a predetermined position) is applied to the second area.

At least a portion of sub-content different from the identified sub-content that is the first sub-content may be further displayed in the second area. For example, when second sub-content or third sub-content identified by the mobile terminal is present, at least a portion 1222 of the second sub-content or at least a portion 1223 of the third sub-content may be displayed in the second area. Here, the second sub-content or the third sub-content may include content previously identified in like manner that the first sub-content is identified as described above.

When a plurality of sub-contents is displayed in the second area, the mobile terminal may display the sub-contents in the second area based on a predetermined rule. For example, the mobile terminal may display the plurality of sub-contents based on an identification order of the sub-contents, but not be limited thereto.

When sub-content is selected based on an input to the sub-content displayed in the second area and an input corresponding to a first icon 1225 is received, the mobile terminal may display recommended sub-content related to the selected sub-content in the second area as indicated by reference numeral 1203 or 1204. For example, when an input for selecting at least the portion 1221 of the first sub-content is received and an input for selecting the first icon 1225 is received, the recommended sub-content related to the first sub-content may be displayed in the second area. In this example, the first icon 1225 including a text "see recommended advertisement" may be displayed. However, this is merely an example and should not be construed as being limited thereto. The sub-content displayed in response to the input corresponding to the first icon 1225 may be determined based on the plurality of sub-contents displayed in the second area. Such determination may be performed by an application for displaying the sub-content in the second area.

The reference numerals 1203 and 1204 show a second side of the mobile terminal. As indicated by the reference numeral 1203, the second area of the display may be located on the second side of the mobile terminal. In a portion of the second area, first sub-content 1231 may be displayed. Also, one or more recommended sub-contents (e.g., an advertisement A, an advertisement B, and an advertisement C) may be displayed in another portion, for example, a portion 1235 of the second area. The first sub-content 1231 may correspond to the first sub-content identified based on the input described with reference to the reference numeral 1201. In contrast to the portion 1221 of the first sub-content being displayed as indicated by the reference numeral 1201, the first sub-content may be fully displayed as indicated by the reference numeral 1203.

In some cases, a portion in which the first sub-content 1231 is displayed in the second area may be referred to as the "second area" and another portion, for example, the portion 1235 in which the recommended sub-contents are displayed may be referred to as a "third area." However, the present disclosure is not limited to such terminology.

The recommended sub-contents displayed along with the first sub-content 1231 may be related to the first sub-content 1231. For example, the recommended sub-contents may include predetermined content corresponding to a keyword of the first sub-content 1231. Specifically, when the first sub-content 1231 is an advertisement for "fried chicken," a keyword of the first sub-content 1231 may include "fried chicken." In this case, recommended sub-content may include advertisement content including the keyword "fried chicken" among various recommended sub-contents determined in advance.

When a plurality of recommended sub-contents is provided, various recommended sub-contents may be displayed in the second area based on an input. For example, as indicated by the reference numeral 1203, an input (e.g., a scroll input) for requesting another sub-content to be displayed may be applied while the first sub-content 1231 and recommended sub-contents are displayed. In this example, other recommended sub-contents (e.g., an advertisement D, an advertisement E, an advertisement F, an advertisement G, an advertisement H, and an advertisement I) may be displayed in the second area as indicated by the reference numeral 1204.

A number of recommended sub-contents to be displayed or a displayed form of recommended sub-content may vary based on an example and is not limited to the examples illustrated herein.

Figure 13:
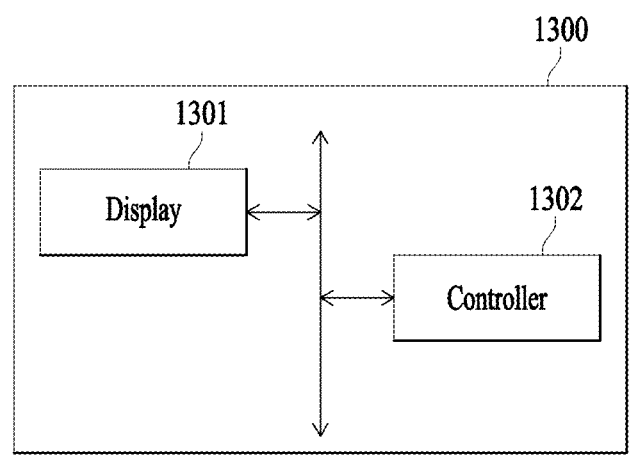
FIG. 13 is a functional block diagram illustrating a mobile terminal according to an example embodiment of the present disclosure.

FIG. 13 is a functional block diagram illustrating a mobile terminal according to an example embodiment of the present disclosure. As described below, an element of a mobile terminal 1300 may be a unit that processes at least one function or operation and may be implemented through hardware, software, or a combination of hardware and software.

Referring to FIG. 13, the mobile terminal 1300 may include a display 1301 and a controller 1302.

The display 1301 may be disposed such that a size by which the display 1301 is exposed at a first side of the mobile terminal 1300 (e.g., a front side of the mobile terminal 1300) is changeable. The size by which the display 1301 is exposed at the first side may be changed based on a control of the controller 1302 described below.

A portion of the display 1301 may be located at the first side of the mobile terminal 1300 and another portion may be located at another side of the mobile terminal 1300 (e.g., a rear side or a side surface of the mobile terminal 1300). As an example, a first area of the display 1301 may be located at the first side of the mobile terminal 1300 and a second area of the display 1301 may be located at the second side facing the first side. As another example, the first area of the display 1301 may be located at the first side of the mobile terminal 1300, and at least a portion of the second area of the display 1301 may be located at a third side. The third side may be located between the first side and the second side and wound on one side of the mobile terminal 1300.

A portion of the display 1301 may be located at the first side. Also, another portion of the display 1301 may be wound on one side of the mobile terminal 1300 and located at the second side of the mobile terminal 1300. Specifically, the display 1301 may be bent at one end contacting the first side, have at least a portion located at the first side, and have at least another portion located at the second side contacting the one end. However, embodiments are not limited thereto. The display 1301 may be divided into a plurality of areas connected using hinges. The display 1301 may be disposed such that one area of the plurality of areas is fixedly located at the first side and another area is located at the first side or the second side based on hinge driving.

A variety of information associated with an operation of the mobile terminal 1300 may be displayed on the display 1301. For example, an icon of an application or content of the application provided based on an execution of the application may be displayed on the display 1301. Here, the icon of the application may include an icon to which an input is applied for execution of the application. Also, the content of the application may include various contents related to a function of the application provided when the application is executed. The display 1301 may include a touch screen to sense a touch input received on the display 1301.

The controller 1302 may control the mobile terminal 1300 or an element of the mobile terminal 1300. For example, the controller 1302 may execute application programs or instructions stored in a memory, thereby controlling an operation of the display 1301.

The controller 1302 may display content related to the first application in the first area of the display 1301 located at the first side based on the execution of the first application. The first area may include at least a portion of the display 1301 located at the first side. The content related to the first application may be content provided based on the execution of the first application. For example, when the first application is a photo album application, the content related to the first application may include an image representing pictures.

The content related to the first application may include at least one sub-content. The at least one sub-content may include predetermined content provided for the purpose of advertisement in association with the first application. For example, the at least one sub-content may include at least one advertisement content. The at least one sub-content may be provided from a server of the first application or an advertisement server designated in association with the first application.

In one example, when the first application is a video application and the content related to the first application is video, the at least one sub-content may include an advertisement video or advertisement image inserted in a middle of the video. However, the present example is not to be taken as being limited thereto. For each application, advertisement content may be provided in various ways, and sub-content may correspond to such advertisement content.

Sub-content may include content including a keyword related to an advertisement, data related to the advertisement, or a code related to the advertisement. As an example, when the sub-content is an image, the sub-content may include content in which a text "advertisement" is displayed in the image. As another example, the sub-content may include content including a code or predetermined data indicating an advertisement in data corresponding to the sub-content. As another example, the sub-content may include content corresponding to a portion including a predetermined keyword indicating an advertisement, of information of a webpage provided by the first application.

The controller 1302 may receive a first input corresponding to one or more sub-contents of the at least one sub-content included in the content related to the first application. For example, when the content related to the first application is displayed in the first area, the controller 1302 may receive the first input for selecting first sub-content. The first input may include, for example, a touch input to at least a portion of the first sub-content. However, this is merely an example, and the first input may include a predetermined input, for example, a long-press input applied to the first area.

The controller 1302 may identify the one or more sub-contents corresponding to the first input in response to the first input being received. As an example, when the first input is received, the controller 1302 may identify content displayed at a position in which the first input is received, as the sub-content. As another example, when the first input is received, the controller 1302 may identify advertisement content included in the content displayed in the first area, as the sub-content. The identification of the advertisement content may be performed based on a keyword corresponding to the advertisement or based on whether an image corresponding to the advertisement is included. Related description will be made in detail with reference to FIG. 17.

The controller 1302 may display at least a portion of the one or more sub-contents (hereinafter, referred to as "first sub-content") identified based on the first input, in the second area of the display located at the second side. In one example, the controller 1302 may store information on the first sub-content and when a second input requesting the second area to be activated is applied, display at least a portion of the first sub-content in the second area. The second input may be a predetermined input and include, for example, a long-press input applied to the second area.

In another example, when a pose of the mobile terminal 1300 corresponds to a predetermined range, the controller 1302 may display the first sub-content in the second area of the display located at the second side. Specifically, when a value representing a pose of the mobile terminal 1300 obtained through a pose sensor included in the mobile terminal 1300 is included in a predetermined range, the controller 1302 may display the first sub-content in the second area. In this example, the pose of the mobile terminal 1300 corresponding to the predetermined range may include, for example, a pose at which the mobile terminal 1300 is turned, that is, a pose at which the mobile terminal 1300 faces a user. As to the pose sensing method, since other various known techniques are applicable as would be apparent to one skilled in the art, redundant description will be omitted.

The controller 1302 may move the first sub-content on the display located at the first side. For example, when the first input is received, the controller 1302 may separate sub-content corresponding to the first input, create a picture-in-picture (PIP) icon, and move the PIP icon on the display located at the first side in response to the first input being moved. When the first input is an input that slides in a first direction after long-pressing for two seconds, the controller 1302 may move the sub-content created in a form of the PIP icon in response to the input sliding in the first direction.

When the content related to the first application includes a plurality of sub-contents and the first input corresponds to a predetermined input, the controller 1302 may identify the plurality of sub-contents in response to the first input being received. For example, when the first input includes a predetermined input, the controller 1302 may identify all the sub-contents included in the content related to the first application. Here, the predetermined input may be distinguished from the above-described input for identifying one or more sub-contents. For example, the input for identifying the one or more sub-contents may be an input of touching at least a portion of sub-content for less than two seconds. Also, the input for identifying the plurality of sub-contents may be a long-touch input of touching at least a portion of the first area for three seconds or more.

The controller 1302 may display recommended sub-content related to the one or more sub-contents in a third area of the display located at the second side. For example, the controller 1302 may display the recommended sub-content related to the first sub-content in the third area of the display located at the second side in response to at least a portion of the first sub-content being displayed in the second area of the display located at the second side based on the identification of the first sub-content.

In addition to the first sub-content, other identified sub-content (hereinafter, referred to as "second sub-content") may be further displayed in the second area. In this case, the controller 1302 may receive an input for selecting either the first sub-content or the second sub-content and an input for requesting recommended sub-content related to the selected sub-content. Through this, the controller 1302 may display the recommended sub-content related to the selected sub-content. For example, the controller 1302 may display the recommended sub-content in the third area of the display 1301 located at the second side. The description of FIG. 12 can be further referenced in relation thereto.

The one or more sub-contents included in the content of the first application may be provided by the first application. The recommended sub-content may be acquired from a server related to the mobile terminal 1300 based on a keyword corresponding to the one or more sub-contents, and then provided. For example, the first sub-content may be provided by the first application. Also, the recommended sub-content displayed based on the selection of the first sub-content may be acquired from the server related to the mobile terminal 1300 based on the keyword corresponding to the first sub-content, and then provided.

In this case, the controller 1302 may acquire the one or more sub-contents from the server related to the first application and display the acquired the one or more sub-contents. Also, the controller 1302 may acquire the recommended sub-content from the server related to the mobile terminal 1300 and display the acquired recommended sub-content. Here, the server related to the first application may include, for example, a server that provides information for driving the first application or a predetermined advertising server related to the first application. The server related to the mobile terminal 1300 may be a server for providing the recommended sub-content, and may include a server of a supplier of the mobile terminal 1300 but is not limited thereto.

The controller 1302 may determine commission information based on a period of time in which the sub-content or the recommended sub-content is displayed. Specifically, the controller 1302 may determine commission information associated with the first application based on a period of time in which the first sub-content is displayed, and determine commission information associated with the mobile terminal 1300 based on a period of time in which the recommended sub-content is displayed. For example, the commission information associated with the first application may be commission information to be provided to the server related to the first application and may include information on the period of time in which the sub-content is displayed on the display 1301. The commission information associated with the mobile terminal 1300 may include information on the period of time in which the recommended sub-content is displayed on the display 1301.

For example, when the sub-content is displayed for two seconds and the recommended sub-content is displayed for five seconds, the controller 1302 may generate commission information corresponding to the two seconds and provide the commission information to the server related to the first application. Also, the controller 1302 may generate commission information corresponding to the five seconds and provide the commission information to the server related to the mobile terminal 1300.

The controller 1302 may transmit the commission information associated with the first application to the server related to the first application, and transmit the commission information associated with the mobile terminal 1300 to the server related to the mobile terminal 1300. In other words, based on the period of time in which each of the sub-content and the recommended sub-content is displayed, the controller 1302 may transmit the information on the period of time to the corresponding server as the commission information.

When a third input corresponding to a predetermined keyword is received, the controller 1302 may display the recommended sub-content on the display located at the first side based on the keyword. In some cases, when the third input corresponding to the keyword related to the first sub-content is received, the controller 1302 may display recommended sub-content selected based on the keyword on the display located at the first side. In such cases, the displayed recommended sub-content may include recommended sub-content corresponding to the first sub-content.

When the third input corresponding to the keyword related to the first sub-content is received, the controller 1302 may display alarm content on the display located at the first side. When a fourth input corresponding to the alarm content is received, the controller 1302 may display recommended sub-content selected based on the keyword on the display located at the first side. The keyword related to the first sub-content may be determined in advance. The third input may be an input including a keyword, for example, a text input indicating the keyword.

The alarm content may be content indicating that recommended sub-content is present and may include predetermined content, for example, an image, a light emitting pattern, or a text. In some cases, the alarm content may be determined in advance based on a type of recommended sub-content selected based on an input keyword. Here, the type of recommended sub-content may include a type of an item to be advertised, a type of an advertisement method, or a type of information provided through an advertisement.

The type of the item may include, for example, food, clothing, or goods. The type of the advertisement method may include, for example, an image, a video, or a sound. The type of the information may include a discount advertisement or a general advertisement.

In one example, when the third input corresponding to the keyword related to the first sub-content is received, and when recommended sub-content corresponding to the first sub-content is advertisement content related to food (e.g., fried chicken), the alarm content may include an image of a first color (e.g., yellow). When recommended sub-content corresponding to the first sub-content is advertisement content related to a clothing brand, the alarm content may include an image of a second color (e.g., red).

In another example, when recommended sub-content is general advertisement content, the alarm content may include an image of the first color (e.g., yellow). When recommended sub-content is discount advertisement content (e.g., content indicating discount information and content providing a discount coupon), the alarm content may include an image of the second color (e.g., red).

An example of displaying alarm content will be further described with reference to FIG. 19.

When an input for the alarm content is received, the controller 1302 may display the recommended sub-content in at least a portion of the first area of the display located at the first side or in at least a portion of the second area of the display located at the second side. As an example, when an input for the alarm content is received, the controller 1302 may display the recommended sub-content at a center of the first area in a form of a pop-up advertisement. As another example, when an input for the alarm content is received, the controller 1302 may display the recommended sub-content having a predetermined size or more in the second area. A related example will be further described with reference to FIG. 19 or 20.

When another sub-content is displayed in the second area of the second side, the controller 1302 may identify a period of time in which displaying of the other sub-content is maintained in the second area in response to the first input being received. Here, the other sub-content may be sub-content identified before the first sub-content is identified and may be, for example, content of the first application but is not limited thereto. In some cases, the other sub-content may be content of another application.

When the identified period of time exceeds a predetermined period of time, the controller 1302 may display at least a portion of the first sub-content in the second area. Specifically, when the identified period of time exceeds the predetermined period of time, the controller 1302 may suspend displaying the other sub-content and display at least a portion of the first sub-content. For example, when the identified period of time exceeds the predetermined period of time, the controller 1302 may replace the other sub-content with the first sub-content.

The controller 1302 may verify whether the other sub-content is displayed in the second area of the second side in response to the first input being received. When the other sub-content is displayed in the second area of the second side, the controller 1302 may identify a period of time in which displaying of the other sub-content is maintained in the corresponding area and control the first sub-content to be displayed based on the identified period of time as described above.

In some cases, a predetermined number of sub-contents may be displayed in the second area. In such cases, the controller 1302 may identify a number of sub-contents displayed in the second area of the second side in response to the first input being received, and determine to display the first sub-content based on the identified number of sub-contents.

For example, when three sub-contents are to be displayed in the first area, the controller 1302 may identify the number of sub-contents displayed in the second area in response to the first input being received. When two sub-contents are displayed in the second area, the controller 1302 may display the first sub-content in the second area. When three sub-contents are displayed in the second area, the controller 1302 may identify a period of time in which each of the sub-contents is displayed in the second area. In this case, the controller 1302 may identify sub-content corresponding to the identified period of time exceeding a predetermined time. Also, the controller 1302 may suspend displaying the identified sub-content and display the first sub-content in the second area.

When sub-content corresponding to the identified period of time exceeding the predetermined is not identified, the first sub-content may be held instead of being displayed in the second area. In this case, the controller 1302 may identify a display maintenance time of sub-content of the second area at preset time intervals, thereby identifying sub-content corresponding to a display maintenance time exceeding a predetermined period of time. When the sub-content corresponding to the display maintenance time exceeding the predetermined period of time is identified, the controller 1302 may display the held first sub-content in the second area instead of the identified sub-content.

The controller 1302 may suspend or omit displaying the first sub-content in the first area of the display 1301 located at the first side in response to the first sub-content being identified. A related example will be further described with reference to FIG. 15 or 16.

In response to the second area of the display 1301 located at the second side being located at the first side, the controller 1302 may display at least a portion of the first sub-content on the display located at the first side. In some cases, in response to the second area being located at the first side, the controller 1302 may display the first sub-content and at least a portion of recommended sub-content related to the first sub-content on the display 1301 located at the first side. A related example will be further described with reference to FIG. 21.

When at least a portion of the second area of the display 1301 located at the second side is located to the first side in a state in which the second area is activated, the controller 1302 may display the first sub-content or at least a portion of the recommended sub-content on the display located at the first side. Here, the first sub-content may include sub-content identified in advance and the recommended sub-content may include recommended sub-content related to the first sub-content. Also, the state in which the second area is activated may include, for example, a state in which the first sub-content and at least a portion of the recommended sub-content are displayed in the second area.

When the mobile terminal 1300 is in a locked state or the display 1301 located at the first side is in an activated state, the controller 1302 may display at least one of the first sub-content, the recommended sub-content, and predetermined advertisement content on the display 1301 located at the second side. As an example, when the mobile terminal 1300 is in the locked state, the controller 1302 may display recommended sub-content associated with the first sub-content in the second area of the display 1301 located at the second side.

As another example, when the display 1301 located at the first side is in the activated state, the controller 1302 may display predetermined advertisement content in the second area of the display 1301 located at the second side. Specifically, when a user views the first side of the mobile terminal 1300 while holding the mobile terminal 1300, the second side of the mobile terminal 1300 may be exposed in a direction facing a position of the user. In this case, sub-content, recommended sub-content, or a predetermined advertisement may be exposed at the second side, so that the second side is used as an advertisement platform.

However, the foregoing examples are not to be taken as being limited thereto. When the display 1301 located at the first side of the mobile terminal 1300 is deactivated and the display 1301 located at the second side is activated, sub-content, recommended sub-content, or a predetermined advertisement may be displayed on the second side.

The activated state of the display 1301 located at the first side may include, for example, a case in which content of an application is displayed or an input is applied to at least a portion of the first area of the display 1301 located at the first side. The locked state of the mobile terminal 1300 may include a state in which a locked screen is displayed or an always on display (AOD) state.

When advertisement content is displayed on the display 1301 located at the second side, or when the user is using the first side of the mobile terminal 1300, the second side may be exposed to other users, whereby the mobile terminal 1300 is used as an advertisement platform. In this case, a company (e.g., a server operator of the mobile terminal 1300) related to advertisement content (e.g., the first sub-content, the recommended sub-content, and the predetermined advertisement content) exposed at the second side may obtain an advertisement commission.

Figure 14:
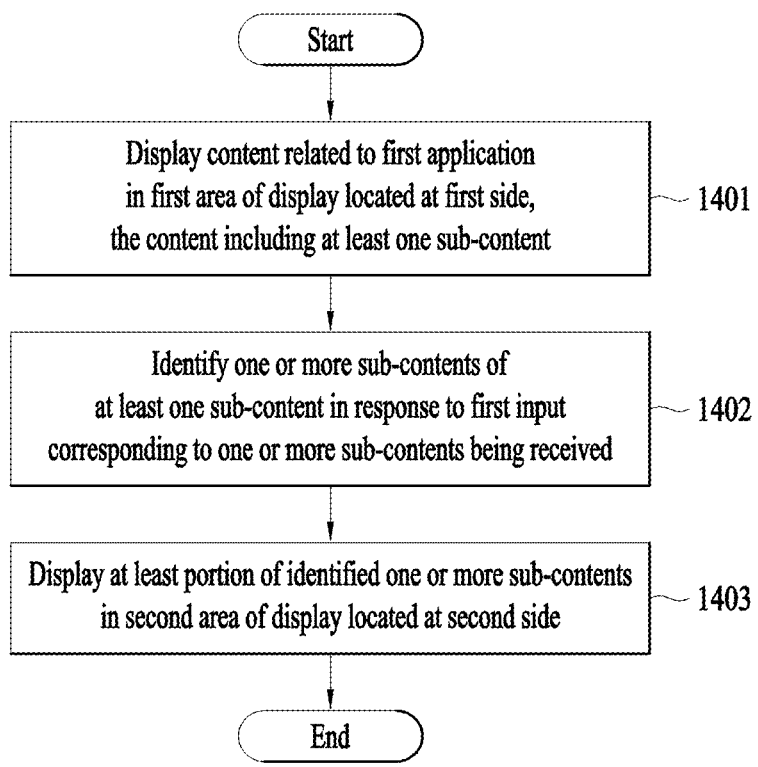
FIG. 14 is a flowchart illustrating a method of controlling a mobile terminal according to an example embodiment of the present disclosure.

FIG. 14 is a flowchart illustrating a method of controlling a mobile terminal according to an example embodiment of the present disclosure. Operations illustrated in FIG. 14 may be performed in different orders or irrespective of an order depending on cases. Hereinafter, redundant description which has been made above will be omitted.

Referring to FIG. 14, in operation 1401, a mobile terminal may display content related to a first application in a first area of a display located at a first side, the content including at least one sub-content. For example, the content related to the first application may include content provided by the first application based on an execution of the first application. Sub-content may be content for advertisement and may include predetermined advertisement content related to the first application. The sub-content may be provided by the first application.

As an example, when the content related to the first application includes video content and the at least one sub-content includes advertisement content provided in a form of a video, the at least one sub-content may be content set to be displayed for at least a portion of a playback time of the video content. For example, at least one sub-content displayed by suspending playing the video content at a predetermined point in time while the video content is played may include advertisement content.

As another example, when the content related to the first application includes web browser content, and when the at least one sub-content includes image content provided in a form of a banner, the at least one sub-content may be displayed to overlap at least a portion of the web browser content. A method of displaying advertisement content is not limited to the foregoing examples and the advertisement content may be displayed in various ways.

The advertisement content may be distinguished from general content, for example, non-advertisement content of the first application. For example, the advertisement content may be content including a predetermined keyword (e.g., a keyword "advertisement") or an advertisement code. The general content may include content other than the advertisement content and may be provided in association with functions of the first application in general.

In operation 1402, the mobile terminal may identify one or more sub-contents of the at least one sub-content in response to the first input corresponding to the one or more sub-contents being received. Specifically, the mobile terminal may identify one or more sub-contents selected based on reception of the first input for selecting the one or more sub-contents.

In response to the first input being received, the mobile terminal may display one or more sub-contents corresponding to the first input in a PIP form. The mobile terminal may receive an input for content displayed in the PIP form. For example, when the one or more sub-contents includes a plurality of sub-contents, the mobile terminal may display PIP content corresponding to each of the plurality of sub-contents. In this example, in response to an input (e.g., a long-press input, a drag input) for selecting at least one of the displayed PIP contents being received, the mobile terminal may identify sub-content corresponding to the selected PIP content as the one or more sub-contents.

When an input for the PIP content includes a drag input of moving from a first position to a second position, the PIP content may be moved in response to the input.

In operation 1403, the mobile terminal may display at least a portion of the identified one or more sub-contents in a second area of the display located at a second side. For example, when the one or more sub-contents (hereinafter, referred to as "first sub-content") corresponds to image content, the mobile terminal may display a portion of the image content in the second area.

The mobile terminal may display recommended sub-content associated with the first sub-content in the second area of the display located at the second side. The recommended sub-content may be acquired from a server related to the mobile terminal based on a keyword corresponding to the first sub-content. The recommended sub-content may be, for example, advertisement content related to the first sub-content, and may be content for advertising an object similar to an object advertised using the first sub-content. Unlike the first sub-content, the recommended sub-content may include content provided from a server related to the mobile terminal.

A plurality of sub-contents may be displayed in the second area. In this case, when one of the plurality of sub-contents displayed in the second area is selected, the mobile terminal may identify a keyword of the selected sub-content. The mobile terminal may acquire predetermined recommended sub-content corresponding to the identified keyword from a server of the mobile terminal and display the acquired recommended sub-content in the second area.

The server for providing the recommended sub-content may be implemented as another device, for example, a server of an advertisement application connected to the mobile terminal. That is, the server for providing the recommended sub-content may be implemented as a device different from a device providing sub-content in the first application. In this case, commission information corresponding to respective advertisements of the sub-content and the recommended sub-content may be transmitted to different devices. For example, the mobile terminal may transmit commission information related to the sub-content to the server related to the first application and transmit commission information related to the recommended sub-content to a server related to the mobile terminal.

When the first sub-content or the recommended sub-content is displayed in the second area, touch input sensing of the second area may be deactivated. In this case, even when the first sub-content or the recommended sub-content is displayed in the second area while a user is using the first side, an erroneous input may not occur, so that an error in operation of the mobile terminal is prevented.

The mobile terminal may determine whether to activate the second area based on pose information of the mobile terminal or an input for requesting the second area to be activated. As an example, when a pose of the mobile terminal corresponds to a predetermined range, the mobile terminal may activate the second area. As another example, when an input for requesting the second area to be activated, for example, an input of pressing a physical key for two seconds is applied, the mobile terminal may activate the second area.

The mobile terminal may suspend or omit displaying the first sub-content on the display located at the first side based on an identification of the first sub-content. For example, in response to the first sub-content being identified, the mobile terminal may suspend displaying the first sub-content in the first area in which the content related to the first application is displayed.

The mobile terminal may store information on the first sub-content in response to the first sub-content being identified. The first sub-content may be advertisement content related to a predetermined keyword. In this case, in response to the predetermined keyword being input to the first area, the mobile terminal may display the first sub-content in at least a portion of the display (e.g., the first area of the display located at the first side or the second area of the display located at the second side).

In some cases, the mobile terminal may identify the recommended sub-content related to the first sub-content in response to the first sub-content being identified. The mobile terminal may display at least one of the first sub-content and the recommended sub-content on the display in response to a predetermined keyword corresponding to the first sub-content (or the recommended sub-content) being input to the first area. Related description will be made with reference to FIG. 19 or 20.

Figure 15:
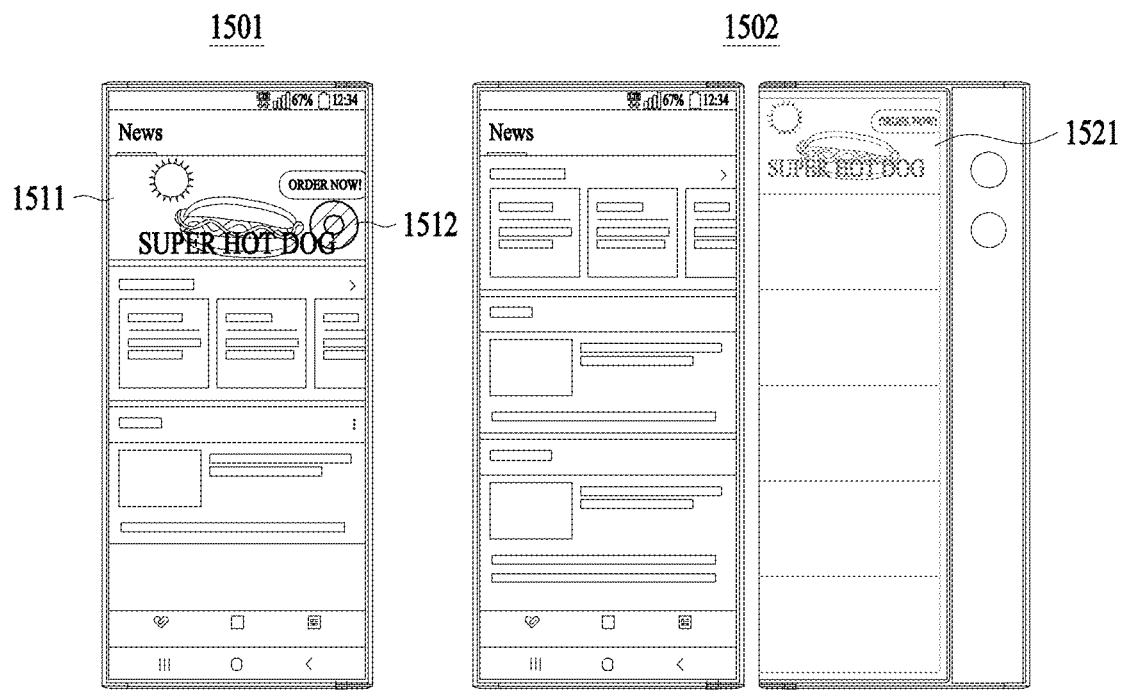
FIG. 15 illustrates an operation of a mobile terminal performed in association with sub-content according to an example embodiment of the present disclosure.

FIG. 15 illustrates an operation performed by a mobile terminal in association with sub-content of according to an example embodiment of the present disclosure. Specifically, FIG. 15 illustrates an example of removing, based on an identification of sub-content, the sub-content from an area (e.g., a first area) of a display and displaying the sub-content in another area (e.g., a second area).

Reference numeral 1501 of FIG. 15 represents a first side of a mobile terminal. Specifically, referring to the reference numeral 1501, content of an application may be displayed in a first area of a display located at the first side. The displayed content may include sub-content 1511. For example, as indicated by the reference numeral 1501, web browser content may be displayed based on an execution of a web browser application. The web browser content may include the sub-content 1511 as advertisement content.

An input 1512 may be applied to at least a portion of the sub-content 1511. The mobile terminal may identify the sub-content 1511 corresponding to the input 1512. For example, when the input 1512 is applied, the mobile terminal may identify content displayed in a position to which the input 1512 is applied, as the sub-content 1511.

Although not shown, in some cases, the content displayed in the position to which the input 1512 is applied may not be advertisement content but is general content. In preparation for such cases, the mobile terminal may identify sub-content arranged in a position closest to the position corresponding to the input 1512 to be the sub-content 1511.

Meanwhile, although FIG. 15 illustrates that the input 1512 is applied to an area in which the sub-content 1511 is displayed as an example, embodiments are not limited thereto.

Reference numeral 1502 represents a first side (e.g., a front side) and a second side (e.g., a rear side) of the mobile terminal in sequence. Referring to the reference numeral 1502, the mobile terminal may suspend or omit displaying the sub-content 1511 on the first side based on an identification of the sub-content 1511. The mobile terminal may display at least a portion 1521 of the sub-content 1511 in the second area of the second side based on the identification of the sub-content 1511. Here, the second area may include at least a portion of the display located at the second side.

In response to the at least the portion of the sub-content 1511 being displayed in the second area, the mobile terminal may deactivate touch input sensing of the second area or display another layer to be superimposed thereon. In some cases, in response to the at least the portion of the sub-content 1511 being displayed in the second area, the mobile terminal may control a brightness of the second area to a predetermined value.

Figure 16:
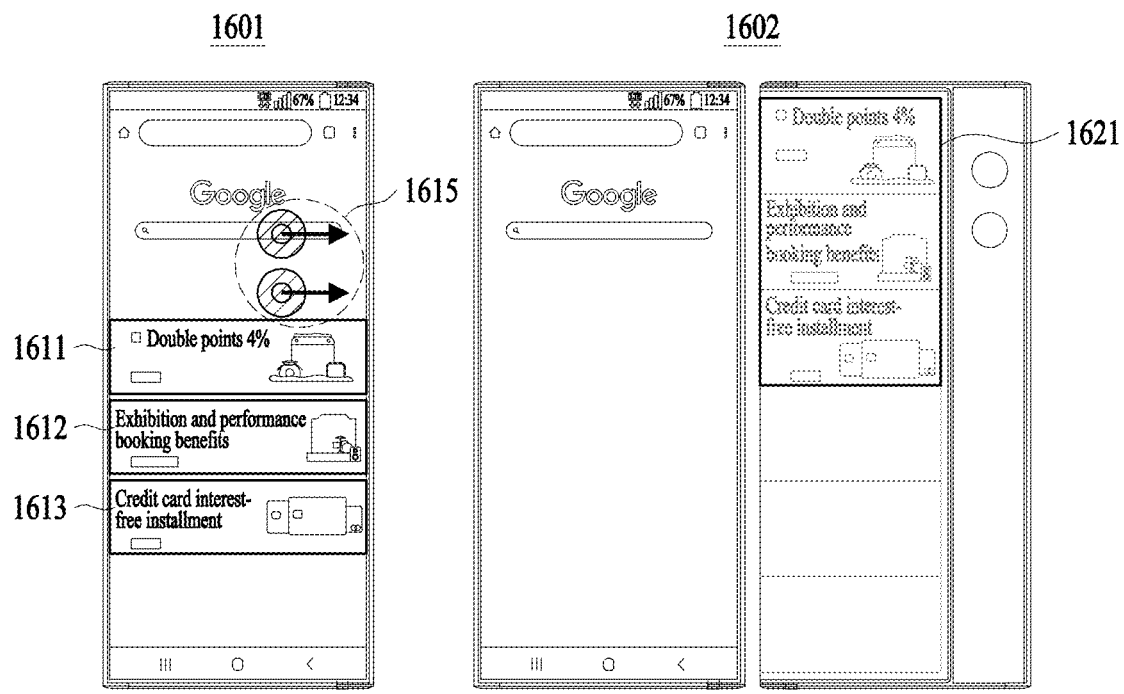
FIG. 16 illustrates an operation of a mobile terminal performed in association with a plurality of sub-contents according to an example embodiment of the present disclosure.

FIG. 16 illustrates an operation performed by a mobile terminal in association with a plurality of sub-contents according to an example embodiment of the present disclosure. Specifically, FIG. 16 illustrates an example of removing, based on an identification of a plurality of sub-contents, the identified sub-contents from an area (e.g., a first area) of a display and displaying the sub-contents in another area (e.g., a second area) of the display.

Reference numeral 1601 of FIG. 16 represents a first side of a mobile terminal. Specifically, referring to the reference numeral 1601, a plurality of sub-contents may be displayed in a first area of a display located at the first side. Specifically, contents related to a first application may be displayed in the first area. The displayed contents may include first sub-content 1611, second sub-content 1612, and third sub-content 1613.

The mobile terminal may identify the first sub-content 1611, the second sub-content 1612, and the third sub-content 1613 included in the contents related to the first application based on reception of the first input 1615. A type of the first input 1615 for identifying the plurality of sub-contents may be determined in advance. Although FIG. 16 illustrates the first input 1615 as swipe inputs applied to two positions in at least a portion of the first area as an example, the type of the first input 1615 is not limited thereto.

Reference numeral 1602 represents a first side (e.g., a front side) and a second side (e.g., a rear side) of the mobile terminal in sequence. Referring to the reference numeral 1602, the mobile terminal may suspend or omit displaying sub-content on the first side based on an identification of the sub-content. For example, when the first sub-content 1611, the second sub-content 1612, and the third sub-content 1613 are identified, the mobile terminal may remove (or suspend displaying) the first sub-content 1611, the second sub-content 1612, and the third sub-content 1613 from the first area.

As indicated by the reference numeral 1602, the mobile terminal may display at least a portion 1621 of each of the plurality of sub-contents in the second area of the second side based on the identification of the plurality of sub-contents. Specifically, when the first sub-content 1611, the second sub-content 1612, and the third sub-content 1613 are identified, the mobile terminal may display at least a portion of the first sub-content, at least a portion of the second sub-content, and at least a portion of the third sub-content in the second area.

In some cases, the mobile terminal may deactivate touch input sensing for the second area in which at least a portion of sub-content is displayed or display another layer to be superimposed thereon. Also, the mobile terminal may control a brightness of the second area in which at least a portion of sub-content is displayed, to a predetermined value.

Figure 17:
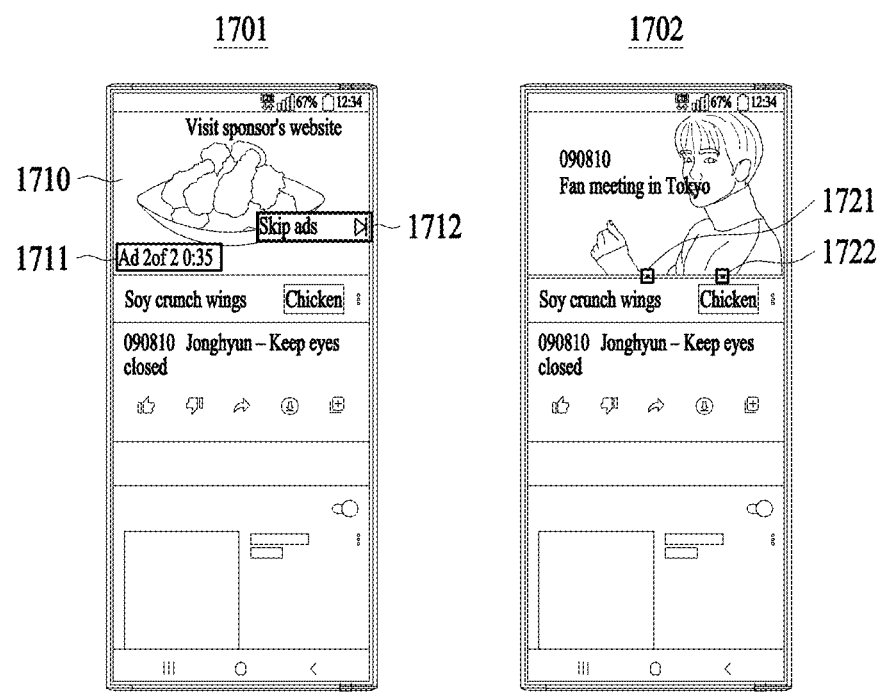
FIG. 17 illustrates a mobile terminal identifying sub-content according to an example embodiment of the present disclosure.

FIG. 17 illustrates a mobile terminal identifying sub-content according to an example embodiment of the present disclosure. Specifically, FIG. 17 illustrates an operation of identifying sub-content in a case in which content related to a first application includes video content.

Reference numeral 1701 of FIG. 17 represents a case in which playback of video content is suspended and sub-content 1710 is displayed. The sub-content 1710 may include a predetermined keyword. As an example, a text "advertisement" may be included in a first portion 1711 of the sub-content 1710 as a keyword. As another example, an icon may be displayed in a second portion 1712 of the sub-content 1710. As illustrated, the icon may include the text "advertisement" as a keyword.

For example, among displayed contents, content including a predetermined keyword may be sub-content. In other words, sub-content may include content including a predetermined keyword, for example, the keyword corresponding to the text "advertisement."

In a state in which a screen indicated by the reference numeral 1701 is displayed on the first side of the display, an input for selecting the sub-content 1710 displayed thereon may be applied. In this case, the mobile terminal may identify the sub-content 1710. The input for selecting the sub-content 1710 may be a predetermined input and may include, for example, an input to an icon displayed in the second portion 1712 but is not limited thereto.

Referring to the reference numeral 1702, the content related to the first application may include video content. As illustrated, the video content may include bar content corresponding to a playback time at a bottom of the video content. On the bar content, first content 1721 and second content 1722 indicating times in which sub-contents inserted in the video content are played may be displayed.

In this case, instead of the video content, sub-content may be displayed at a playback time point of video content corresponding to the first content 1721 and a playback time point of video content corresponding to the second content 1722. Sub-contents corresponding to the first content 1721 and the second content 1722 may be different contents. However, it is merely an example and, in some cases, the same sub-content may be repetitively played.

Information on the first content 1721 and the second content 1722 may be determined in advance. When an input for requesting identification of a plurality of sub-contents is applied, the mobile terminal may identify the first content 1721 and the second content 1722 based on an image analysis and identify respective sub-contents corresponding to the first content 1721 and the second content 1722 by analyzing a web page.

The input for requesting the identification of the plurality of sub-contents may be determined in advance and distinguished from an input for selecting one specified sub-content, for example, the sub-content 1710. For example, the input for requesting the identification of the plurality of sub-contents may include swipe inputs to a plurality of positions or long-press inputs to a plurality of positions.

In addition to the sub-contents inserted in the video content, sub-content may also be displayed in various positions, for example, below the video content. In this case, the mobile terminal may identify all the sub-contents included in the content related to the first application as well as the sub-contents corresponding to the first content 1721 and the second content 1722.

In some cases, the mobile terminal may determine sub-content to be displayed on the second side of the mobile terminal based on an input for selecting at least one of the identified sub-contents. Since the input for selecting at least one of the sub-contents has been described with reference to FIG. 11, related description will be omitted.

Figure 18:
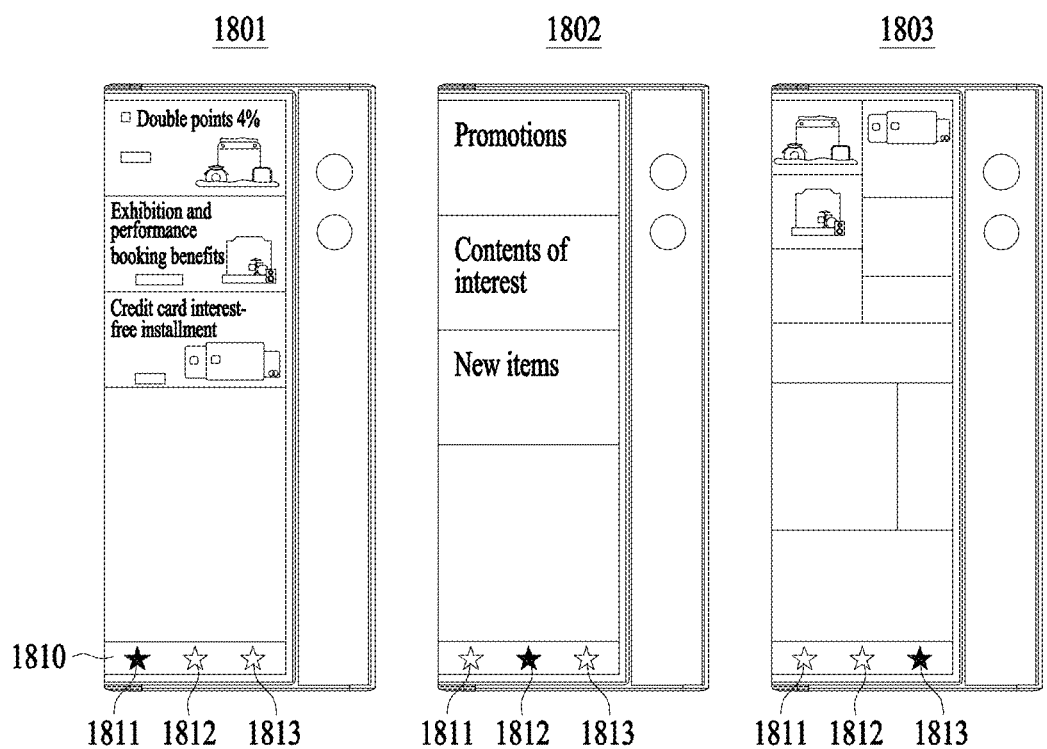
FIG. 18 illustrates a mobile terminal displaying sub-content according to an example embodiment of the present disclosure.

FIG. 18 illustrates a mobile terminal displaying sub-content according to an example embodiment of the present disclosure. Specifically, FIG. 18 illustrates examples of displaying sub-content on a second side of a mobile terminal.

Reference numeral 1801 represents a second side of the mobile terminal. The second side may include a second area in which at least a portion of each of a plurality of sub-contents is displayed. Specifically, the reference numeral 1801 represents an example of displaying at least a portion of each of the plurality of sub-contents in a form of a list. The at least the portion of each of the sub-contents may be arranged in sequence. In this case, various arrangement methods may be applied thereto. For example, at least a portion of each of the plurality of sub-contents may be arranged based on a point in time at which sub-content is identified.

Reference numeral 1802 represents a second side of the mobile terminal. A plurality of sub-contents may be categorized based on characteristics and information on each category may be displayed on the second side. The characteristics of the plurality of sub-contents may be determined in advance. For example, the characteristics of the plurality of sub-contents may include content corresponding to a promotion, content of interest, or content of a new item. In this case, categories corresponding to the characteristic may be displayed and sub-content may be arranged to belong to a category corresponding to its characteristic. When a category is selected, content arranged in the selected category may be displayed.

Reference numeral 1803 represents the second side of the mobile terminal. Images related to a plurality of sub-contents may be displayed on the second side. Each of the plurality of sub-contents determined to be displayed in the second area may include an image. The mobile terminal may identify a representative image of each of the plurality of sub-contents and display the identified representative image in the second area as indicated by the reference numeral 1803. Such display type of sub-content is an image-based display, which may improve user's intuitiveness with respect to the sub-content.

Referring to the reference numerals 1801 through 1803, a bar 1810 including icons (e.g., a first icon 1811, a second icon 1812, and a third icon 1813) for selecting a content display type may be displayed at a bottom of the display located at the second side. In this case, in response to the first icon 1811 being selected, the second area may appear as shown by the reference numeral 1801. Also, in response to the second icon 1812 being selected, the second area may appear as shown by the reference numeral 1802. When the third icon 1813 is selected, the second area may appear as shown by the reference numeral 1803.

The bar 1810 may be displayed in response to an input of a user. For example, in response to sub-content being identified, sub-content may be displayed in the second area as indicated by the reference numeral 1801. When a touch input is applied to the second area, the bar 1810 may be displayed in the second area as shown at the bottom of the display. Based on an icon (e.g., the second icon 1812 and the third icon 1813) included in the bar 1810, content may be displayed in the second area as indicated by the reference numeral 1802 or 1803.

In some cases, in response to sub-content being identified, a screen display type of the display located at the second side may be set based on an input of a user. For example, in response to sub-content being identified, the sub-content may be displayed in the second area based on a display type shown by the reference numeral 1802.

Figure 19:
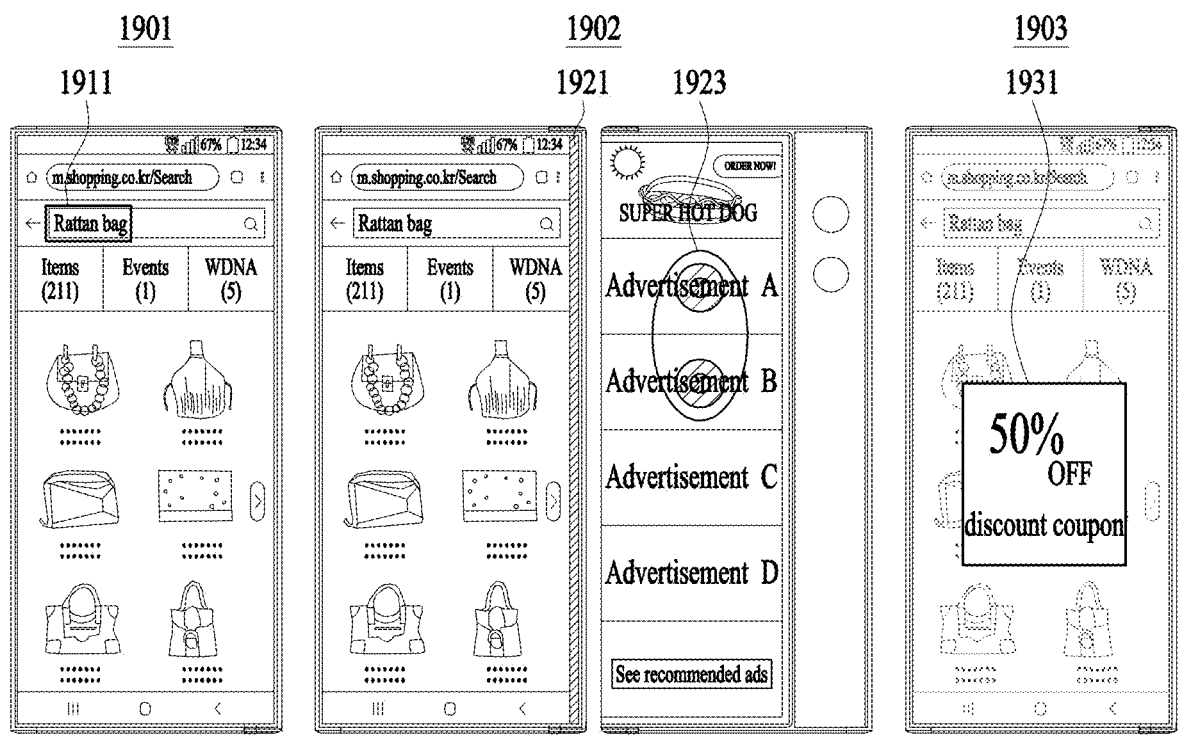
FIGS. 19 and 20 illustrate a mobile terminal providing content based on a keyword according to an example embodiment of the present disclosure.
Figure 20:
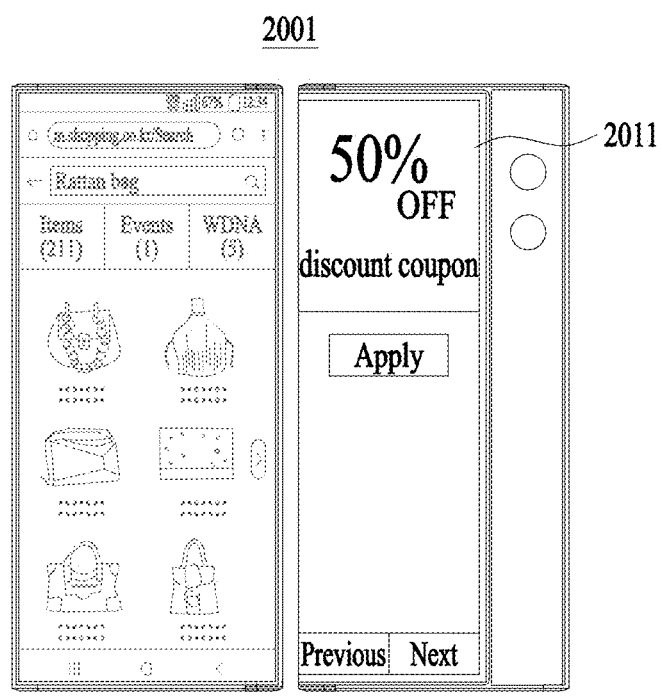

FIGS. 19 and 20 illustrate a mobile terminal providing content based on a keyword according to an example embodiment of the present disclosure.

FIG. 19 illustrates an example of displaying sub-content or recommended sub-content based on an input of a keyword 1911. Specifically, referring to reference numeral 1901, the keyword 1911 may be input. The keyword 1911 may include a keyword corresponding to sub-content identified in advance. For example, the mobile terminal may have a history that sub-content corresponding to a keyword "rattan bag" included in content related to a first application has been identified based on an execution of the first application. In this case, information on the identified sub-content may be stored in the mobile terminal.

As indicated by the reference numeral 1901, the keyword "rattan bag" may be input to the mobile terminal based on an execution of a second application. The mobile terminal may identify at least one of sub-content and recommended sub-content corresponding to the keyword "rattan bag" in response to the keyword being input.

Information on the recommended sub-content may be stored in the mobile terminal. However, it is merely an example and, in some cases, the mobile terminal may acquire recommended sub-content corresponding to the keyword 1911 when the keyword 1911 is input. The mobile terminal may identify the recommended sub-content based on the acquisition of the recommended sub-content.

Reference numeral 1902 represents a first side and a second side of the mobile terminal in sequence. Referring to the reference numeral 1902, when the sub-content and the recommended sub-content corresponding to the input keyword 1911 are identified, alarm content 1921 may be displayed on the display of the first side as illustrated.

The alarm content may include, for example, an image represented by a specific color and shape (e.g., a yellow bar) or an image displayed in a predetermined pattern. The reference numeral 1902 shows the alarm content displayed on a right side surface of the first side as an example. However, a position of the alarm content is not limited to the example.

The alarm content may be determined based on a type of identified content corresponding to the keyword 1911. For example, when a type of content corresponding to the keyword 1911 is a first type, first alarm content may be displayed. Also, when a type of content corresponding to the keyword 1911 is a second type, second alarm content may be displayed.

For example, when content corresponding to the keyword 1911 corresponds to a discount advertisement, the first alarm content may be displayed. Also, when content corresponding to the keyword 1911 corresponds to an advertisement of general goods, the second alarm content may be displayed. Here, the discount advertisement may include information on a discount event of a specific product or a specific web site, and the advertisement of general goods may include information indicating a specific product. However, it is merely an example and embodiments are not limited to the example.

Referring to the reference numeral 1902, in response to the sub-content or the recommended sub-content corresponding to the keyword 1911 being identified, at least a portion of the recommended sub-content or the sub-content may be displayed on the second side. Here, content displayed on the second side may include at least a portion of the recommended sub-content or the sub-content corresponding to the keyword 1911. However, it is merely an example and various identified sub-contents or recommended sub-content may be displayed.

When an input 1923 is applied to at least a portion of the display located at the second side, as indicated by reference numeral 1903, recommended sub-content (or sub-content) 1931 corresponding to the keyword 1911 may be displayed in at least a portion of the display located at the first side. The reference numeral 1903 shows a case in which the recommended sub-content 1931 related to the discount advertisement is displayed based on the keyword 1911. However, embodiments are not limited thereto. For example, among sub-contents identified in advance, sub-content corresponding to the keyword 1911 may be displayed.

The input 1923 applied to a second area may include an input determined for displaying content (e.g., sub-content, the recommended sub-content 1931) corresponding to the keyword 1911 on the display located at the first side. For example, an input may include touch inputs to a plurality of positions but is not limited thereto. The input may also be implemented in various types of inputs.

In some cases, the input 1923 may include an input maintained for a predetermined period of time or more. For example, the input 1923 may include a touch input that a touch is maintained for three seconds or more. In this example, the recommended sub-content 1931 of the reference numeral 1903 may be displayed based on a period of time in which the touch input is maintained. In other words, when the touch input is maintained for three seconds, the recommended sub-content 1931 may be displayed for a corresponding period of time.

FIG. 20 illustrates an example of displaying sub-content or recommended sub-content corresponding to the keyword 1911 of the reference numeral 1901 in a second area of a display located at a second side.

Specifically, FIG. 20 illustrates a first side and a second side of a mobile terminal in sequence. In the example of FIG. 20, sub-content or recommended sub-content may be displayed based on an application of the input 1923 as described through the reference numeral 1902 of FIG. 19.

As indicated by reference numeral 2001, when the input 1923 of FIG. 19 is applied, recommended sub-content (or sub-content) 2011 corresponding to an identified keyword (e.g., the keyword 1911 of FIG. 19) may be displayed on the display of the second side. For example, the recommended sub-content 2011 corresponding to the keyword 1911 may be displayed in a form of a full screen on the display of the second side.

When a pose of the mobile terminal is included in a predetermined range, and when an input (e.g., the input 1923 of FIG. 19) corresponding to alarm content is received, the mobile terminal may display the recommended sub-content (or sub-content) 2011 on the display of the second side.

Figure 21:
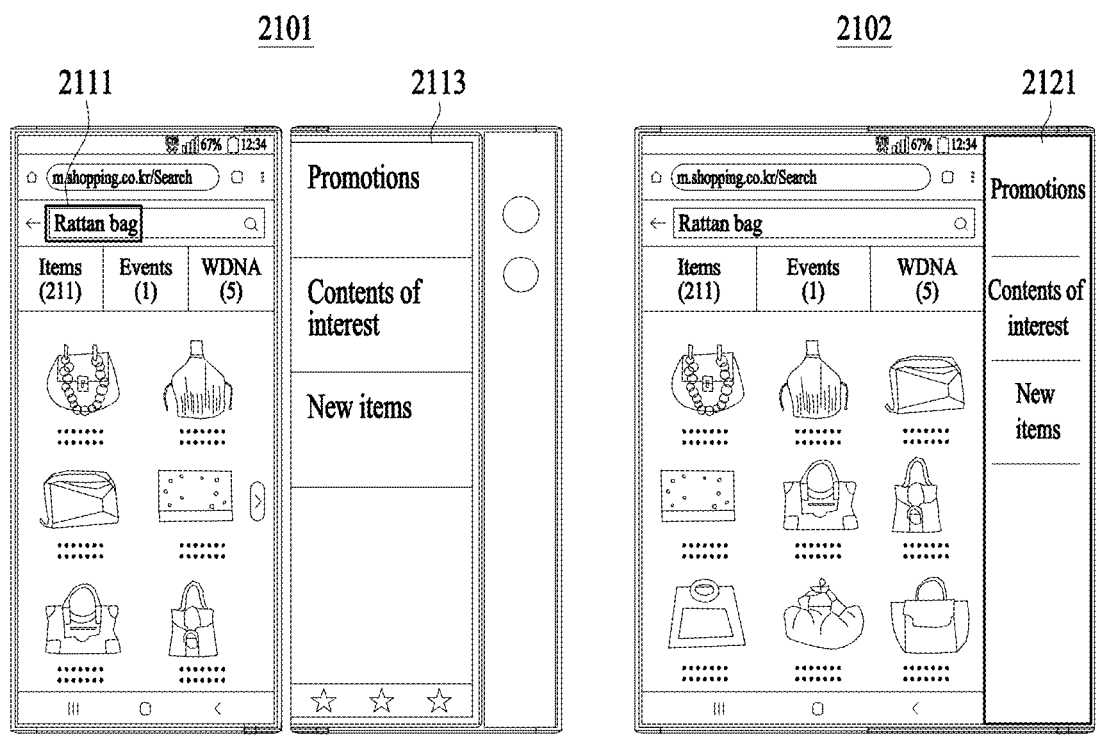
FIG. 21 illustrates content displayed based on a size change of a display of a mobile terminal according to an example embodiment of the present disclosure.

FIG. 21 illustrates content displayed based on a size change of a display of a mobile terminal according to an example embodiment of the present disclosure.

Reference numeral 2101 of FIG. 21 sequentially represents a first side and a second side of a mobile terminal when a size by which a display is located at the first side is a first size. Reference numeral 2102 represents the first side of the mobile terminal when the size by which the display is located at the first side is a second size (greater than the first size). For example, as indicated by the reference numeral 2102, the size by which the display is located at the first side may increase in response to an area of the display located at the second side being moved to the first side.

As indicated by the reference numeral 2101, a keyword 2111 may be input to the display located at the first side. Also, a category or at least a portion of recommended sub-content or sub-content related to the keyword 2111 may be displayed in a second area 2113 of the display located at the second side. When the category is displayed on the second side, at least a portion of the sub-content or recommended sub-content included in the category may be displayed as a preview in at least a portion of an area corresponding to the category.

When the display located at the first side extends in a state shown by the reference numeral 2101, a screen displayed on the first side may be changed as indicated by the reference numeral 2102. Specifically, referring to the reference numeral 2102, the display located at the first side may include a first area and a second area. Content displayed in the first area as shown by the reference numeral 2101 may extend to be displayed in the first area and at least a portion of the second area.

When the display located at the first side extends, another content related to the content displayed in the first area as shown by the reference numeral 2101 may be further displayed. For example, content that has not been displayed on the screen of the reference numeral 2101 may be further displayed on the first side. The content newly displayed on the first side may include content following (or connected with) the content that has been displayed in the first area but is not limited thereto.

Referring to the reference numeral 2102, sub-content or the recommended sub-content may be displayed in at least a portion 2121 of the second area. The content displayed in at least the portion 2121 of the second area may correspond to content provided through the second area 2113 on the screen of the reference numeral 2101. However, it is merely an example and in some cases, a portion of the content provided through the second area 2113 may be displayed.

Figure 22:
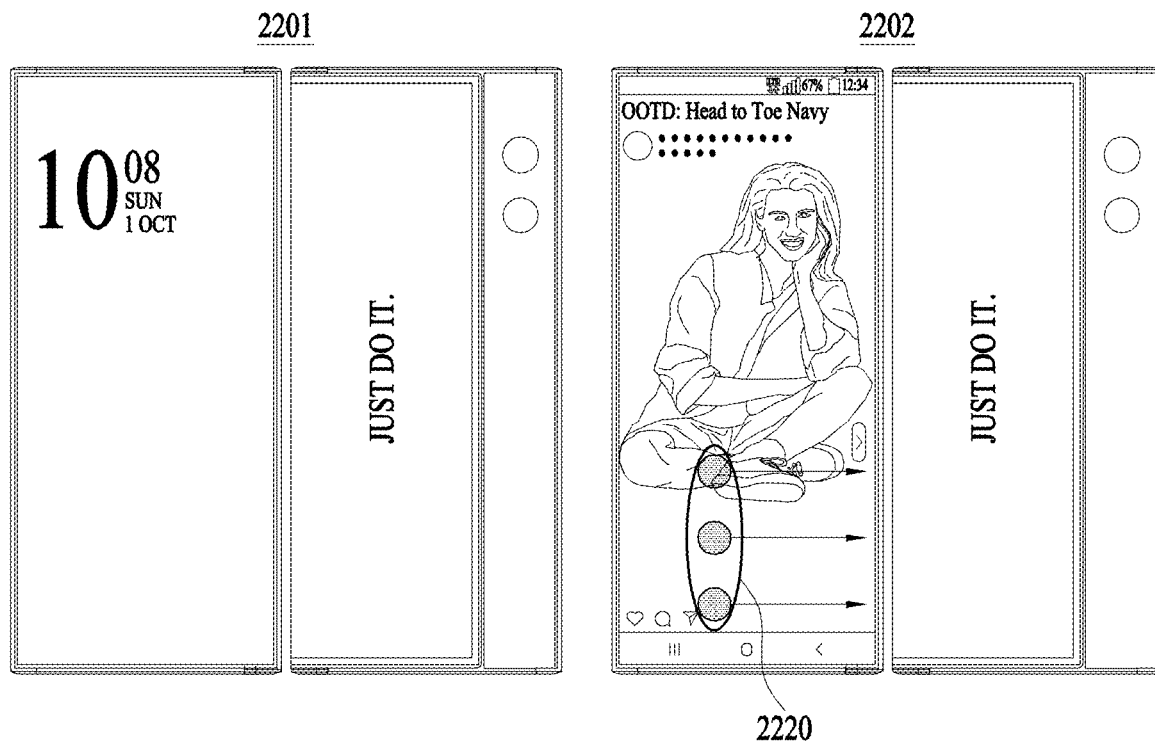

FIGS. 22 and 23 illustrate a mobile terminal displaying sub-content according to an example embodiment of the present disclosure.

Reference numerals 2201 and 2202 of FIG. 22 each illustrate a first side and a second side of a mobile terminal in sequence. The first side of the reference numeral 2201 may be in a locked state or an AOD state. In this case, predetermined advertisement content may be displayed on the second side. Here, the predetermined advertisement content may include content determined based on information provided from a server or user settings but is not limited thereto. In some cases, sub-content or recommended sub-content may be displayed on the second side.

The predetermined advertisement content may include an image corresponding to a specific brand. For example, the predetermined advertisement content may include an emblem of the specific brand. However, it is merely an example, and the predetermined advertisement content may be implemented in various forms of advertisement content.

Referring to the reference numeral 2202, in response to the first side of the mobile terminal being activated, content of a predetermined application may be displayed in a first area located on the first side of the mobile terminal. The predetermined application may include an application irrelevant to sub-content or recommended sub-content. As illustrated, an input 2220 may be applied to the first side. In this case, the predetermined advertisement content may be displayed on the second side.

Reference numeral 2301 of FIG. 23 illustrates a first side and a second side of a mobile terminal in sequence and may correspond to the reference numeral 2201 of FIG. 22. In a state in which predetermined advertisement content is displayed on the second side as indicated by the reference numeral 2301, a display located at the first side may extend and be unlocked, so that a home screen is displayed as indicated by reference numeral 2302.

In this case, as shown in the screen indicated by the reference numeral 2302, first advertisement content 2321 related to predetermined content may be displayed in a partial area of the display located at the first side. The first advertisement content 2321 may include advertisement content that is different from but has the same purpose as the advertisement content displayed on the second side indicated by the reference numeral 2301, for example, a different type of advertisement content. However, it is merely an example and in some cases, content corresponding to the predetermined content may be displayed.

An input to the first advertisement content 2321 may be received. As indicated by reference numeral 2303, second advertisement content 2331 may be displayed in a portion of the display located at the first side. Also, a web page 2332 related to the second advertisement content 2331 may be displayed in another portion of the display located at the first side. The second advertisement content 2331 may be extended content of the first advertisement content 2321 and may correspond to the first advertisement content 2321 but is not limited thereto. The web page 2332 related to the second advertisement content 2331 may be determined in advance.

In some cases, at least one of the first advertisement content 2321, the second advertisement content 2331, and the web page 2332 may be displayed in a PIP form. Content displayed in the PIP form may be moved on the display based on a user input.

In the present disclosure, a mobile terminal and a method of controlling the mobile terminal may separately display sub-content, which is advertisement content displayed on a display located at a first side, on a second side so that a user can easily use content of an application displayed on the display of the first side.

In addition, in the present disclosure, a mobile terminal and a method of controlling the mobile terminal may display recommended sub-content associated with sub-content based on an identification of the sub-content such that a variety of information is provided to a user.

Also, in the present disclosure, a mobile terminal and a method of controlling the mobile terminal may display sub-content or recommended sub-content through a second side when a first side of the mobile terminal is in use so that the sub-content or recommended sub-content is exposed to a third party, which may create advertising effects.

According to example embodiments, it is possible to provide a mobile terminal and a method of controlling the mobile terminal, the mobile terminal which provides sub-content through a second area of a display among contents provided in a first area of the display so that a user selectively identifies sub-content corresponding to user's needs. As such, displaying of sub-content may be controlled based on the user's needs so that the user more easily identifies content using the mobile terminal.

Further, according to example embodiments, it is possible to provide a mobile terminal and a method of controlling the mobile terminal, the mobile terminal which provides recommended sub-content related to sub-content based on an identification of the sub-content, thereby providing useful and various information to a user.

Effects are not limited to the aforementioned effects, and other effects not mentioned will be clearly understood by those skilled in the art from the description of the claims.

The above description is merely illustrative of the technical idea of the present disclosure, and those skilled in the art to which the present disclosure pertains can make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. A mobile terminal comprising:
 a display located at a first side of the mobile terminal and a second side of the mobile terminal facing the first side; and
 a controller,
 wherein the controller is configured to:
 display content related to a first application at a first area of the display located at the first side, the content related to the first application including at least one sub-content;
 identify one or more sub-contents of the at least one sub-content when a first input related to the one or more sub-contents is received on an area where the content related to the first application is displayed; and
 display at least a portion of the identified one or more sub-contents at a second area of the display located at the second side,
 wherein the at least one sub-content includes a plurality of sub-contents, and
 wherein when the first input corresponds to a predetermined input, the controller is further configured to identify the plurality of sub-contents in response to the first input being received.

2. The mobile terminal of claim 1, wherein when a pose of the mobile terminal corresponds to a predetermined range, the controller is further configured to display at least a portion of the one or more sub-contents at the second area of the display located at the second side.

3. The mobile terminal of claim 1, wherein the controller is further configured to display recommended sub-content associated with the one or more sub-contents at a third area of the display located at the second side.

4. The mobile terminal of claim 3, wherein the one or more sub-contents are provided by the first application, and wherein the recommended sub-content is acquired from a server related to the mobile terminal based on a keyword corresponding to the one or more sub-contents.

5. The mobile terminal of claim 3, wherein commission information is determined based on a period of time during which the recommended sub-content is displayed.

6. The mobile terminal of claim 3, wherein the controller is further configured to determine commission information related to the first application based on a period of time during which the one or more sub-contents are displayed, and determine commission information related to the mobile terminal based on a period of time during which the recommended sub-content is displayed.

7. The mobile terminal of claim 1, wherein when a second input corresponding to a keyword related to the one or more sub-contents is received, the controller is further configured to display, at the display located at the first side, recommended sub-content selected based on the keyword.

8. The mobile terminal of claim 1, wherein when a second input corresponding to a keyword related to the one or more sub-contents is received, the controller is further configured to display predetermined alarm content at the display located at the first side, and
wherein when a third input corresponding to the predetermined alarm content is received, the controller is further configured to display, at the display located at the first side, recommended sub-content selected based on the keyword.

9. The mobile terminal of claim 8, wherein the predetermined alarm content includes content corresponding to a type of the recommended sub-content.

10. The mobile terminal of claim 1, wherein when another sub-content is displayed at the second area, the controller is further configured to identify a period of time during which display of the other sub-content is maintained at the second area in response to the first input being received, and
wherein when the identified period of time exceeds a predetermined period of time, the controller is further configured to suspend the display of the other sub-content and display at least a portion of the one or more sub-contents at the second area.

11. The mobile terminal of claim 1, wherein, in response to the first input, the controller is further configured to omit displaying of the one or more sub-contents at the first area or display another content at the first area.

12. The mobile terminal of claim 1, wherein the content related to the first application includes video content, and
wherein the at least one sub-content includes advertisement content that is inserted in at least a portion of a period of time before a playback time of the video content, during the playback time or after the playback time, and displayed.

13. The mobile terminal of claim 1, wherein the one or more sub-contents are moved at the display located at the first side based on reception of the first input.

14. The mobile terminal of claim 1, wherein, in response to the second area being located at the first side, the controller is further configured to display at least a portion of the one or more sub-contents at the display located at the first side.

15. The mobile terminal of claim 1, wherein when the mobile terminal is in a locked state, or when the display located at the first side is an activated state, the controller is further configured to display, at the display located at the second side, at least one of the one or more sub-contents, recommended sub-content associated with the one or more sub-contents, or predetermined advertisement content.

16. The mobile terminal of claim 1, wherein the display includes:
a flexible display having a side located between the first side and the second side of the mobile terminal and wound around one side of the mobile terminal, and
wherein a size of the flexible display that is located at the first side is changed based on a control of the controller.

17. A mobile terminal comprising:
a display located at a first side of the mobile terminal and a second side of the mobile terminal facing the first side; and
a controller,
wherein the controller is configured to:
display content related to a first application at a first area of the display located at the first side, the content including at least one sub-content;
identify one or more sub-contents of the at least one sub-content in response to a first input related to the one or more sub-contents being received; and
display at least a portion of the identified one or more sub-contents at a second area of the display located at the second side,
wherein when a second input corresponding to a keyword related to the one or more sub-contents is received, the controller is further configured to display predetermined alarm content at the display located at the first side, and
wherein when a third input corresponding to the predetermined alarm content is received, the controller is further configured to display, at the display located at the first side, recommended sub-content selected based on the keyword.

18. The mobile terminal of claim 17, wherein the predetermined alarm content includes content corresponding to a type of the recommended sub-content.

19. A mobile terminal comprising:
a display located at a first side of the mobile terminal and a second side of the mobile terminal facing the first side; and
a controller,
wherein the controller is configured to:
display content related to a first application at a first area of the display located at the first side, the content including at least one sub-content;
identify one or more sub-contents of the at least one sub-content in response to a first input related to the one or more sub-contents being received; and
display at least a portion of the identified one or more sub-contents at a second area of the display located at the second side,
wherein when another sub-content is displayed at the second area, the controller is further configured to identify a period of time during which display of the other sub-content is maintained at the second area in response to the first input being received, and
wherein when the identified period of time exceeds a predetermined period of time, the controller is further configured to suspend the display of the other sub-content and display at least a portion of the one or more sub-contents at the second area.

* * * * *